(12) United States Patent
Murata et al.

(10) Patent No.: US 9,097,230 B2
(45) Date of Patent: Aug. 4, 2015

(54) ENGINE START SYSTEM MINIMIZING MECHANICAL IMPACT OR NOISE

(71) Applicant: DENSO CORPORATION, Kariya, Aichi-pref. (JP)

(72) Inventors: Mitsuhiro Murata, Niwa-gun (JP); Hideya Notani, Kariya (JP); Shinji Usami, Okazaki (JP); Mikio Saito, Mizuho (JP); Yasuyuki Yoshida, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/060,915

(22) Filed: Oct. 23, 2013

(65) Prior Publication Data

US 2014/0041613 A1 Feb. 13, 2014

Related U.S. Application Data

(62) Division of application No. 12/754,818, filed on Apr. 6, 2010, now Pat. No. 8,985,080.

(30) Foreign Application Priority Data

| Apr. 7, 2009 | (JP) | 2009-093044 |
| Jun. 10, 2009 | (JP) | 2009-139060 |
| Aug. 24, 2009 | (JP) | 2009-192728 |
| Nov. 4, 2009 | (JP) | 2009-252889 |
| Dec. 17, 2009 | (JP) | 2009-286536 |

(51) Int. Cl.
*F02N 11/08* (2006.01)
*G06F 19/00* (2011.01)
*G06G 7/70* (2006.01)

(52) U.S. Cl.
CPC ............ *F02N 11/08* (2013.01); *F02N 11/0844* (2013.01); *F02N 11/0855* (2013.01); *Y02T 10/48* (2013.01); *Y10T 74/132* (2015.01)

(58) Field of Classification Search
CPC ............ F02N 11/0855; F02N 11/0844; F02N 11/087; F02N 11/0851
USPC ............. 123/179.25, 179.3, 179.4; 290/38 R, 290/38 C, 38 E; 701/112, 113
See application file for complete search history.

(56) References Cited

U.S. PATENT DOCUMENTS

2003/0230271 A1* 12/2003 Maruhashi et al. ........ 123/179.3
2005/0099009 A1* 5/2005 Spellman et al. ........... 290/38 R (Continued)

FOREIGN PATENT DOCUMENTS

| JP | Y2-56-42437 | 4/1981 |
| JP | Y2-56-42434 | 10/1981 |

(Continued)

OTHER PUBLICATIONS

Aug. 20, 2013 Office Action issued in Japanese Patent Application No. 2010-034487 (with English translation).

(Continued)

*Primary Examiner* — Mahmoud Gimie
*Assistant Examiner* — Sizo Vilakazi
(74) *Attorney, Agent, or Firm* — Oliff PLC

(57) ABSTRACT

An engine start system which may be employed in automotive idle stop systems. To start an engine, the system brings a pinion gear into engagement with a ring gear coupled to the engine and turns on an electric motor to rotate the ring gear through the pinion gear to crank the engine. When it is requested to start the engine during deceleration of the engine before stop thereof, the system thrusts the pinion into engagement with the ring gear and then turns on the motor to rotate the pinion gear, in other words, delays the activation of the motor until after the pinion gear has engaged the ring gear. This minimizes mechanical impact or noise arising from the engagement of the pinion gear with the ring gear and improves the reliability in engagement with the ring gear during the deceleration of the engine and durability of the system.

20 Claims, 17 Drawing Sheets

(56) References Cited

U.S. PATENT DOCUMENTS

| | | | |
|---|---|---|---|
| 2007/0137602 A1* | 6/2007 | Kassner | 123/179.25 |
| 2008/0127927 A1* | 6/2008 | Hirning et al. | 123/179.3 |
| 2009/0020091 A1* | 1/2009 | Botzenhard et al. | 123/179.3 |
| 2010/0059007 A1* | 3/2010 | Senda et al. | 123/179.4 |
| 2010/0299053 A1* | 11/2010 | Okumoto et al. | 701/113 |
| 2011/0132308 A1* | 6/2011 | Liu et al. | 123/179.4 |
| 2011/0221210 A1* | 9/2011 | Suzuki | 290/38 R |
| 2011/0270512 A1* | 11/2011 | Hayashi et al. | 701/112 |

FOREIGN PATENT DOCUMENTS

| | | |
|---|---|---|
| JP | A-5-180130 | 7/1993 |
| JP | A-2002-70699 | 3/2002 |
| JP | A-2003-65191 | 3/2003 |
| JP | A-2003-83212 | 3/2003 |
| JP | A-2003-301765 | 10/2003 |
| JP | A-2004-11627 | 1/2004 |
| JP | A-2005-330813 | 12/2005 |
| JP | A-2006-161590 | 6/2006 |
| JP | A-2007-107527 | 4/2007 |
| JP | A-2008-121648 | 5/2008 |

OTHER PUBLICATIONS

Office Action issued in U.S. Appl. No. 12/754,818 dated Feb. 7, 2014.

* cited by examiner

ENGINE START SYSTEM MINIMIZING MECHANICAL IMPACT OR NOISE

CROSS-REFERENCE TO RELATED APPLICATIONS

This application is a divisional of U.S. patent application Ser. No. 12/754,818 filed on Apr. 6, 2010, which in turn claims the benefits of priority of Japanese Patent Application Nos. 2009-93044 filed on Apr. 7, 2009, 2009-139060 filed on Jun. 10, 2009, 2009-192728 filed on Aug. 24, 2009, 2009-252889 filed on Nov. 4, 2009, and 2009-286536 filed on Dec. 17, 2009, disclosures of which are incorporated herein by reference.

BACKGROUND OF THE INVENTION

1. Technical Field of the Invention

The present invention relates generally to an engine start system which may be used in an idle stop system for automotive vehicles (also called an automatic engine stop/restart system) which works to stop an automotive engine automatically, for example, when the vehicle has stopped at an intersection or due to a traffic jam and then restart the engine when the vehicle driver performs a given starting operation (e.g., release of the driver's foot from the brake pedal).

2. Background Art

Automotive vehicles equipped with an automatic engine stop/restart system (also called an idle stop system) designed to stop the engine automatically when an output of the engine is not required and restart the engine automatically when the engine output is requested are expected to increase in order to reduce carbon dioxide emissions or increase the fuel economy.

The idle stop system typically works to automatically cut a supply of fuel to the engine to stop it, for example, when the vehicle stops at a red light at an intersection or in a traffic jam and then restart the engine when given restart requirements are met, e.g., the driver has released the brake pedal and/or shifted a selector lever to a drive range in the automatic transmission. For example, Japanese Patent First Publication No. 2003-301765 discloses such an idle stop system.

The vehicle operator may require the start of the vehicle immediately after the idle stop system has been activated to stop the engine, after which the vehicle stops. In such an event, if it is impossible to restart the engine until it stops completely, which may cause inconvenience to trailing vehicles. This may lead to the discomfort of the vehicle operator. One of requirements the idle stop system is needed to meet is, therefore, to enable the restart of the engine during deceleration thereof before being stopped completely.

In order to meet the above requirement, Japanese Patent First Publication No. 2005-330813 teaches an idle stop system which, when an engine restart request is made during a period of time in which the speed of the engine is decreasing before the engine stops completely, starts energization of a shunt coil to rotate a pinion gear and then brings the pinion gear into engagement with a ring gear installed on a crankshaft of the engine at the time when the rotation of the pinion gear is synchronized with that of the ring gear.

Additionally, Japanese Patent First Publication No. 2007-107527 teaches an idle stop system designed to bring the pinion gear into engagement with the ring gear when the speed of the internal combustion engine falls in a range between given maximum and minimum speeds, and the direction of rotation of the engine matches the forward direction of the crankshaft of the engine.

The idle stop system of Japanese Patent First Publication No. 2005-330813, as described above, requires the synchronization of the speed of the pinion gear with that of the ring gear and thus has the problem that the speed of the engine may drop before an engine starter starts rotating, which results in failure in the synchronization in a very low engine speed range. Moreover, when the idle stop system cuts the fuel to the engine, it usually causes the speed of the engine to drop rapidly and overshoot the zero. The engine then swings in the reverse and forward directions cyclically and eventually stops. In such a speed range where the engine swings (which will be referred to as an engine swing range below), it is very difficult to synchronize the speed of the pinion gear with that of the ring gear. The engagement between the pinion gear and the ring gear will also result in a great deal of mechanical impact between them, which may cause the breakage of the ring gear.

The idle stop system of Japanese Patent First Publication No. 2007-107527 is, as described above, designed to engage the pinion gear with the ring gear only when the direction of rotation of the engine matches the forward direction of the crankshaft of the engine, thus requiring a sensor to measure the direction of rotation of the engine. The system is inhibited from engaging the pinion gear with the ring gear when the engine is rotating in the reverse direction, thus resulting in an increased difficulty in engaging the pinion gear with the ring gear in the engine swing range.

SUMMARY OF THE INVENTION

It is therefore an object of the invention to provide an engine start system which is installed in a vehicle powered by an engine and designed to achieve engagement of a pinion gear with a ring gear of the engine to restart the engine during deceleration thereof until the engine stops and to minimize mechanical impact or noise arising from the engagement of the pinion gear with the ring gear.

According to one aspect of the invention, there is provided an engine start system which may be employed in engine-powered automotive vehicles. The engine start system comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a pinion actuator working to move the pinion movable body to the ring gear; (f) a switching mechanism working to open or close main contacts installed in the motor circuit to cut or supply the electric power from the battery to the motor; (g) controller which controls operations of the pinion actuator and the switching mechanism when the engine is restarted during deceleration of the engine prior to stop of the engine; and (h) delay means for delaying a second operation time that is a time when the switching mechanism is to be activated to close the main contacts until after a first operation time that is a time when the pinion actuator is to be activated to move the pinion movable body when the engine is restarted. The delay means produces a time lag between the first and second operation times so as to close the main contacts through the switching mechanism to supply the electric power to the motor after the pinion movable body is moved by the pinion actuator to advance the pinion gear from a rest position to a gear engageble position where the pinion gear is engageble with the ring gear, and then the pinion gear engages the ring gear.

The phrase "after the pinion movable body is moved by the pinion actuator to advance the pinion gear from a rest position to a gear engageble position where the pinion gear is engageble with the ring gear, and then the pinion gear engages the ring gear" does not necessarily mean "after the pinion gear engages the entire width of the ring gear completely", but contains the meaning of "after the pinion gear at least partially engages the width of the ring gear".

As described above, when it is requested to restart the engine during deceleration of the engine before complete stop thereof, the engine start system of this invention works to electrically or mechanically delay the second operation time when the switching mechanism is to be activated to close the main contacts until after the first operation time when the pinion actuator is to be activated to move the pinion movable body. Specifically, after the pinion actuator moves the pinion movable body, and then the pinion gear engages the ring gear at least partially, the switching mechanism is energized to close the main contacts to energize the motor.

In other words, the switching mechanism does not close the main contacts to keep the motor deenergized during a period of time for which the pinion gear is moved from the rest position to the gear engageble position, so that the torque, as produced by the motor, is not transmitted to the pinion gear until the pinion gear engages the ring gear.

Even if the pinion gear, as moved by the pinion actuator, has failed to engage the ring gear directly, that is, the end of the pinion gear has hit the end surface of the ring gear (usually, the probability that the end of the pinion gear hits the end surface of the ring gear is higher than that the pinion gear is moved by the pinion actuator and then engages the ring gear directly), the pinion gear will then engage the ring gear at a certain angular position because the engine is decelerating, so that ring gear is rotating at a lower speed. This enables the engine to be restarted quickly during deceleration of the engine before complete stop thereof. The motor is kept off until the pinion has engaged the ring gear, thus minimizing mechanical impact or noise arising from the engagement of the pinion gear with the ring gear and improving the reliability in engagement with the ring gear during the deceleration of the engine and durability of the system.

In the preferred mode of the invention, the delay means sets the time lag between the first and second operation times to 30 ms. or more. This ensures the stability of engagement of the pinion gear with the ring gear of the engine before the motor is energized to rotate the pinion gear.

The pinion actuator may be implemented by a solenoid actuator which produces a first electromagnet. The switching mechanism may be implemented by a motor on-off switch which produces a second electromagnet. The controller may be designed to control operations of the solenoid actuator and the motor on-off switch independently of each other and has installed therein a delay function which makes up the delay means. Specifically, the controller serves to control the order of the first and second operation times.

The delay means may alternatively be implemented by a delay circuit connected to an excitation circuit which works to excite the motor on-off switch. This eliminates the need for controlling the operations of the solenoid actuator and the motor on-off switch through separate lines, in other words, it permits a single line to be used to control both the solenoid actuator and the motor on-off switch.

The controller may change the time lag between when the engine is requested to be restarted during the deceleration of the engine and when the engine is requested to be restarted after a complete stop of the engine. The normal start of the engine is achieved by brining the pinion gear into engagement with the ring gear placed in a resting condition, thus enabling the motor to be energized substantially simultaneously with abutment of the end surface of the pinion gear on the end surface of the ring gear. Therefore, there is no need for lengthening a delay time from the abutment of the pinion gear with the end surface of the ring gear until the energization of the motor. The engine start system of this invention may be designed to change the first and second operation times between when the engine is restarted during the deceleration of the engine and when the engine is restarted when the engine is at rest.

The solenoid actuator and the motor on-off switch may be aligned in series with each other in an axial direction thereof. This result in a decrease in area of an assembly of the solenoid actuator and the motor on-off switch projected in the axial direction as compared with when they are arranged radially thereof.

The solenoid actuator and the motor on-off switch may have casings, respectively, which are arrayed integrally in the axial direction as a single piece and constitute a magnetic circuit. This results in a decrease in parts of the engine start system and improves the resistance of the solenoid actuator and the motor on-off switch against external mechanical vibrations.

The engine start system may further include a magnetic coil producing an electromagnet when energized, a plunger which is movable along an inner periphery of the magnetic coil in an axial direction thereof, and a single electromagnetic switch designed to perform both an operation of the pinion actuator and an operation of the switching mechanism following movement of the plunger. The time lag is provided by a plunger stroke that is a distance which the plunger moves from a time when the plunger starts to be moved by attraction, as produced by the electromagnetic, until the main contacts are closed.

For example, the starter, as disclosed in Japanese Patent First Publication No, 2003-301765, as referred to above, is equipped with a single electromagnetic switch designed both as the pinion actuator and as the switching mechanism. Specifically, the electromagnetic switch has installed therein a plunger which is to be moved by attraction, as produced by an electromagnet, to push the pinion gear and close the main contacts simultaneously. A stroke of the plunger is so determined that the main contacts may be closed substantially concurrently with when the end of the pinion gear hits against the end surface of the ring gear. The delay between the closing of the main contacts and the hit of the pinion gear against the ring gear may be provided by lengthening the stroke of the plunger as compared with that in the conventional structure. In the above case, the value of the time lag between the first and second operation times is determined mechanically by lengthening the stroke of the plunger to a desired value.

The engine start system may be installed in a vehicle equipped with an idle stop system working to stop and restart the engine automatically.

According to the second aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a pinion actuator working to move the pinion movable body to the ring gear; (f) a switching mechanism working to open or close main contacts installed in the motor circuit to cut or supply the electric power from the battery to the motor; (g) a controller which controls operations of the pinion actuator and the switching mechanism when the engine is restarted during deceleration of the engine prior to stop of the engine; and (h) delay means for delaying a second operation time that is a time when the switching mechanism is to be activated to close the main contacts until after a first operation time that is a time when the pinion actuator is to be activated to move the pinion movable body when the engine is restarted. The delay means produces a time lag between the first and second operation times so as to close the main contacts through the switching mechanism to supply the electric power to the motor after the pinion movable body is moved by the pinion actuator to advance the pinion gear from a rest position to a maximum movable position where engagement of the pinion gear with the ring gear is to be achieved, and then the pinion gear has engaged the ring gear.

When it is requested to restart the engine during deceleration of the engine before complete stop thereof, the engine start system of this invention works to electrically or mechanically delay the second operation time when the switching mechanism is to be activated to close the main contacts until after the first operation time when the pinion actuator is to be activated to move the pinion movable body. Specifically, after the pinion actuator moves the pinion movable body, and then the pinion gear engages the ring gear at least partially, the switching mechanism is energized to close the main contacts to rotate the motor.

In other words, the switching mechanism does not close the main contacts to keep the motor deenergized during a period of time required by the pinion gear to move from the rest position to the gear engageble position, so that the torque, as produced by the motor, is not transmitted to the pinion gear until the pinion gear engages the ring gear.

Even if the pinion gear, as moved by the pinion actuator, has failed to engage the ring gear directly, that is, the end of the pinion gear has hit the end surface of the ring gear (usually, the probability that the end of the pinion gear hits the end surface of the ring gear is higher than that the pinion gear is moved by the pinion actuator and then engages the ring gear directly), the pinion gear will then engage the ring gear at a certain angular position because the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

In the preferred mode of the invention, the delay means sets the time lag between the first and second operation times to 30 ms. or more, preferably 40 ms. or more.

The pinion actuator may be implemented by a solenoid actuator which produces a first electromagnet. The switching mechanism may be implemented by a motor on-off switch which produces a second electromagnet. The controller may be designed to control operations of the solenoid actuator and the motor on-off switch independently of each other and has installed therein a delay function which makes up the delay means.

The delay means may alternatively be implemented by a delay circuit connected to an excitation circuit which works to excite the motor on-off switch.

The controller changes the time lag between when the engine is requested to be restarted during the deceleration of the engine and when the engine is requested to be restarted after a complete stop of the engine.

The normal start of the engine is achieved by brining the pinion gear into engagement with the ring gear placed in a resting condition, thus enabling the motor to be energized substantially simultaneously with abutment of the end surface of the pinion gear on the end surface of the ring gear. Therefore, there is no need for lengthening a delay time from the abutment of the pinion gear with the end surface of the ring gear until the energization of the motor. The engine start system of this invention may be designed to change the first and second operation times between when the engine is restarted during the deceleration of the engine and when the engine is restarted when the engine is at rest.

The solenoid actuator and the motor on-off switch may be aligned in series with each other in an axial direction thereof.

The solenoid actuator and the motor on-off switch may have casings, respectively, which are arrayed integrally in the axial direction and constitute a magnetic circuit.

The engine start system may further include a magnetic coil producing an electromagnet when energized, a plunger which is movable along an inner periphery of the magnetic coil in an axial direction thereof, and a single electromagnetic switch designed to perform both an operation of the pinion actuator and an operation of the switching mechanism following movement of the plunger. The time lag is provided by a plunger stroke that is a distance which the plunger moves from a time when the plunger starts to be moved by attraction, as produced by the electromagnetic, until the main contacts are closed. Specifically, the delay between the closing of the main contacts and the hit of the pinion gear against the ring gear is provided by lengthening the stroke of the plunger as compared with that in the conventional structure. The value of the time lag between the first and second operation times is determined mechanically by lengthening the stroke of the plunger to a desired value.

The engine start system may be installed in a vehicle equipped with an idle stop system working to stop and restart the engine automatically.

According to the third aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a pinion solenoid actuator which produce magnetic attraction to thrust the pinion movable body toward the ring gear; (f) a motor on-off switch which opens or closes main contacts installed in the motor circuit to cut or supply the electric power to the motor; (g) a first relay disposed in an excitation circuit which supplies electric power from the battery to the pinion solenoid actuator; (h) a second relay disposed in an excitation circuit which supplies electric power from the battery to the motor on-off switch; (i) a controller which electrically controls an operation of the pinion solenoid actuator through the first relay and an operation of the motor on-off switch through the second relay when the engine is restarted during deceleration of the engine prior to stop of the engine; (j) a delay circuit which delays a second operation time that is a time when the second relay is to be energized until after a first operation time that is a time when the first relay is to be energized when the engine is restarted; and (k) a single electric wire connecting with an output port of the controller, the electric wire having a first relay branch line leading to the first relay and a second relay branch line leading to the second relay through the delay circuit. The delay circuit produces a time lag between the first and second operation times so as to close the motor on-off switch to supply the electric power to the motor after the pinion gear is moved by the pinion solenoid actuator from a rest position to a gear engageble position where the pinion gear is engageble with the ring gear and then engages the ring gear or from the rest portion to a maximum movable position where engagement of the pinion gear with the ring gear is to be established and then engages the ring gear.

When it is requested to restart the engine during deceleration of the engine before complete stop thereof, the engine start system of this invention works to electrically or mechanically delay the second operation time when the second relay is energized until after the first operation time when the first relay is energized. Specifically, the delay circuit works to close the motor on-off switch to supply the electric power to the motor after the pinion gear is moved by the pinion solenoid actuator to the gear engageble position or the maximum movable position and then engages the ring gear.

In other words, the main contacts are not closed to keep the motor deenergized during a period of time required by the pinion gear to move to the ring gear and then engages the ring gear. Therefore, the torque, as produced by the motor, is not transmitted to the pinion gear until the pinion gear engages the ring gear.

Even if the pinion gear, as moved by the pinion solenoid actuator, has failed to engage the ring gear directly, that is, the end of the pinion gear has hit the end surface of the ring gear (usually, the probability that the end of the pinion gear hits the end surface of the ring gear is higher than that the pinion gear is moved by the pinion solenoid actuator and then engages the ring gear directly), the pinion gear will then engage the ring gear at a certain angular position because the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

The engine start system may be installed in a vehicle equipped with an idle stop system working to stop and restart the engine automatically.

According to the fourth aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a solenoid switch which works to produce a magnetic attraction to attract a plunger to thrust the pinion gear toward the ring gear and also open or close main contacts installed in the motor circuit interlocking with movement of the plunger for cutting or supplying the electric power to the motor; (i) a motor on-off relay which has relay contacts disposed in the motor circuit and opens or closes the relay contacts electrically; (g) a controller which electrically controls an operation of the solenoid switch and an operation of the motor on-off relay when the engine is restarted during deceleration of the engine prior to stop of the engine; and (h) delay means for delaying a second operation time that is a time when the motor on-off relay is to be energized until after a first operation time that is a time when the solenoid switch is to be energized when the engine is restarted. The delay means produces a time lag between the first and second operation times so as to turn on the motor on-off relay to supply the electric power to the motor after the pinion gear is moved by the solenoid switch to the ring gear and then engages the ring gear at least partially or to a maximum movable position where engagement of the pinion gear with the ring gear is to be established and then engages the ring gear, and after the main contacts are closed.

When it is requested to restart the engine during deceleration of the engine before complete stop thereof, the engine start system of this invention works to electrically or mechanically delay the second operation time when the motor on-off relay is to be energized until the first operation time when the solenoid switch is to be energized. Specifically, the delay means works to close the motor on-off relay to supply the electric power to the motor after the pinion gear is moved by the pinion solenoid actuator to the gear engageble position or the maximum movable position and then engages the ring gear, and the main contacts have already been closed.

In other words, the motor on-off relay is not closed to keep the motor deenergized during a period of time required by the pinion gear to move to the ring gear and then engages the ring gear. Therefore, the torque, as produced by the motor, is not transmitted to the pinion gear until the pinion gear engages the ring gear.

Even if the pinion gear, as moved by the solenoid switch, has failed to engage the ring gear directly, that is, the end of the pinion gear has hit the end surface of the ring gear (usually, the probability that the end of the pinion gear hits the end surface of the ring gear is higher than that the pinion gear is moved by the solenoid switch and then engages the ring gear directly), the pinion gear will then engage the ring gear at a certain angular position because the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

In the preferred mode of the invention, the delay means is implemented by a delay circuit connected to an excitation circuit which works to excite the motor on-off relay and is built in the motor on-off relay.

The motor on-off relay has the relay contacts disposed upstream of the main contacts of the motor circuit. Specifically, the motor on-off relay is disposed between the solenoid switch and the battery, thus eliminating the need for altering the structure of the solenoid switch, that is, permitting the solenoid switch having a typical structure to be used.

The motor on-off relay may be installed on a housing of a starter in which the motor is installed. The starter is a part to be installed on the engine. It is, thus, essential to assure the quality of the starter against mechanical vibrations. In order to meet such quality assurance, the motor on-off relay is secured to the starter housing which is close to an engine mount and smallest in magnitude of the vibration.

The engine start system may be installed in a vehicle equipped with an idle stop system working to stop and restart the engine automatically.

According to the fifth aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a solenoid switch which works to produce a magnetic attraction to attract a plunger to thrust the pinion gear toward the ring gear and has an external terminal which is connected to the motor circuit and through which the electric power is supplied to the motor; (f) a motor on-off relay which has relay contacts disposed in the motor circuit and opens or closes the relay contacts electrically; (g) a controller which electrically controls an operation of the solenoid switch and an operation of the motor on-off relay when the engine is restarted during deceleration of the engine prior to stop of the engine; and (h) delay means for delaying a second operation time that is a time when the motor on-off relay is to be energized until after a first operation time that is a time when the solenoid switch is to be energized on when the engine is restarted. The delay means produces a time lag between the first and second operation times so as to turn on the motor on-off relay to supply the electric power to the motor after the pinion gear is moved by the solenoid switch to the ring gear and then engages the ring gear at least partially or to a maximum movable position where engagement of the pinion gear with the ring gear is to be established and then engages the ring gear.

When it is requested to restart the engine during deceleration of the engine before complete stop thereof, the engine start system of this invention works to electrically or mechanically delay the second operation time when the motor on-off relay is to be energized until the first operation time when the solenoid switch is to be energized. Specifically, the delay means works to close the motor on-off relay to supply the electric power to the motor after the pinion gear is moved by the solenoid switch and engages the ring gear.

In other words, the motor on-off relay is not closed to keep the motor deenergized during a period of time required by the pinion gear to move to the ring gear and then engages the ring gear. Therefore, the torque, as produced by the motor, is not transmitted to the pinion gear until the pinion gear engages the ring gear.

Even if the pinion gear, as moved by the solenoid switch, has failed to engage the ring gear directly, that is, the end of the pinion gear has hit the end surface of the ring gear (usually, the probability that the end of the pinion gear hits the end surface of the ring gear is higher than that the pinion gear is moved by the solenoid switch and then engages the ring gear directly), the pinion gear will then engage the ring gear at a certain angular position because the engine is decelerating, so that the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

In the preferred mode of the invention, the solenoid switch has a first terminal bolt and a second terminal bolt. The first terminal bolt serves as the external terminal. The second terminal bolt connects with the motor through a motor lead. The first and second terminal bolts are connected electrically through a terminal-to-terminal connector. This eliminates the need for main contacts installed in the solenoid switch of a typical structure. The main contacts are usually implemented by a pair of fixed contacts connecting with the motor circuit through two terminal bolts and a movable contact which is moved by movement of the plunger. The structure of the invention may thus omit the fixed contacts and the movable contact.

The solenoid switch having the typical structure may be used as it is. The two terminal bolts are connected through the connector electrically, so that the flow of electric power to the motor is not blocked or established by opening or closing of the main contacts. Specifically, when the motor on-off relay is turned on, the electric power is supplied from the battery to the motor, while when the motor on-off relay is off, the electric power stops being supplied to the motor regardless of opening or closing of the main contacts. The mechanical wear of the main contacts or a failure in making connection therebetween will, therefore, not impinge upon the operation of the engine start system.

The first terminal bolt may serve as the external terminal connecting with the motor through a motor lead. The second terminal bolt is isolated from the motor circuit without being connected to the motor circuit. This also eliminates the need for the main contacts installed in the solenoid switch of a typical structure. Specifically, when the motor on-off relay is turned on, the electric power is supplied from the battery to the motor, while when the motor on-off relay is off, the electric power stops being supplied to the motor regardless of opening or closing of the main contacts. The mechanical wear of the main contacts or a failure in making connection therebetween will, therefore, not impinge upon the operation of the engine start system.

The first terminal bolt may alternatively be isolated from the motor circuit. The second terminal bolt may serve as the external terminal connecting with the motor through a motor lead.

The second terminal bolt is connected to the motor, thus eliminating the need for the main contacts installed in the solenoid switch of a typical structure. Specifically, when the motor on-off relay is turned on, the electric power is supplied from the battery to the motor, while when the motor on-off relay is off, the electric power stops being supplied to the motor regardless of opening or closing of the main contacts. The mechanical wear of the main contacts or a failure in making connection therebetween will, therefore, not impinge upon the operation of the engine start system.

The motor on-off relay may have the relay contacts in the motor circuit upstream of the external terminal. Specifically, the motor on-off relay is disposed between the solenoid switch and the battery, thus eliminating the need for altering the structure of the solenoid switch, that is, permitting the solenoid switch having a typical structure to be used.

The motor on-off relay may be installed on a housing of a starter in which the motor is installed. The starter is a part to be installed on the engine. It is, thus, essential to assure the quality of the starter against mechanical vibrations. In order to meet such quality assurance, the motor on-off relay is secured to the starter housing which is close to an engine mount and smallest in magnitude of the vibration.

The engine start system may be installed in a vehicle equipped with an idle stop system working to stop and restart the engine automatically.

According to the sixth aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a solenoid switch which works to produce a magnetic attraction to attract a plunger to thrust the pinion gear toward the ring gear and has a first and a second terminal bolt connectable with the motor circuit; (f) a motor on-off relay which has relay contacts disposed in the motor circuit and opens or closes the relay contacts electrically; (g) a controller which electrically controls an operation of the solenoid switch and an operation of the motor on-off relay when the engine is restarted during deceleration of the engine prior to stop of the engine; and (h) delay means for delaying a second operation time that is a time when the motor on-off relay is to be energized until after a first operation time that is a time when the solenoid switch is to be energized on when the engine is restarted.

The solenoid switch does not work to establish or block flow of the electric power to the motor and has the first and second terminal bolts disconnected from the motor circuit.

The motor on-off relay works to open or close the relay contacts to block or establish flow of the electric power from the battery to the motor.

The delay means produces a time lag between the first and second operation times so as to turn on the motor on-off relay to establish the flow of the electric power to the motor after the pinion gear is moved by the solenoid switch to the ring gear and then engages the ring gear at least partially or to a maximum movable position where engagement of the pinion gear with the ring gear is to be established and then engages the ring gear.

When it is requested to restart the engine during deceleration of the engine before complete stop thereof, the engine start system of this invention works to electrically or mechanically delay the second operation time when the motor on-off relay is to be energized until the first operation time when the solenoid switch is to be energized. Specifically, the delay means works to close the motor on-off relay to supply the electric power to the motor after the pinion gear is moved by the solenoid switch and engages the ring gear.

In other words, the motor on-off relay is not closed to keep the motor deenergized during a period of time required by the pinion gear to move to the ring gear and then engages the ring gear. Therefore, the torque, as produced by the motor, is not transmitted to the pinion gear until the pinion gear engages the ring gear.

Even if the pinion gear, as moved by the solenoid switch, has failed to engage the ring gear directly, that is, the end of the pinion gear has hit the end surface of the ring gear (usually, the probability that the end of the pinion gear hits the end surface of the ring gear is higher than that the pinion gear is moved by the solenoid switch and then engages the ring gear directly), the pinion gear will then engage the ring gear at a certain angular position because the engine is decelerating, so that the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

Two terminal bolts installed in the solenoid switch are not used in connecting to the motor circuit, but the solenoid switch may be used as it is. The solenoid switch does not function as an on-off switch which establishes or blocks the flow of electric power to the motor. Therefore, mechanical wear of main contacts (i.e., fixed contacts installed on the two terminal bolts and a movable contact making connection between the fixed contacts) or a failure in making connection therebetween will not impinge upon the operation of the engine start system.

The motor on-off relay may have the relay contacts in the motor circuit upstream of the external terminal. Specifically, the motor on-off relay is disposed between the solenoid switch and the battery, thus eliminating the need for altering the structure of the solenoid switch, that is, permitting the solenoid switch having a typical structure to be used.

The motor on-off relay may be installed on a housing of a starter in which the motor is installed. The starter is a part to be installed on the engine. It is, thus, essential to assure the quality of the starter against mechanical vibrations. In order to meet such quality assurance, the motor on-off relay is secured to the starter housing which is close to an engine mount and smallest in magnitude of the vibration.

The engine start system may be installed in a vehicle equipped with an idle stop system working to stop and restart the engine automatically.

According to the seventh aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a solenoid switch which works to produce a magnetic attraction to attract a plunger to thrust the pinion gear toward the ring gear and also open or close main contacts installed in the motor circuit interlocking with movement of the plunger for cutting or supplying the electric power to the motor; (f) a normally closed type of motor on-off relay which has relay contacts disposed in the motor circuit, when deenergized, the motor on-off relay keeping the relay contacts closed; (g) a starter relay which is disposed in an excitation circuit working to supply an excitation current to the solenoid switch from the battery; (h) a motor on-off sub-relay which is disposed in an excitation circuit working to supply an excitation current to the motor on-off relay from the battery; (i) a controller which electrically controls an operation of the solenoid switch through the starter relay and an operation of the motor on-off relay through the motor on-off sub-relay when the engine is restarted during deceleration of the engine prior to stop of the engine; and (j) delay means for delaying a second operation time that is a time when the motor on-off relay is to be energized until after a first operation time that is a time when the solenoid switch is to be energized on when the engine is restarted. The delay means produces a time lag between the first and second operation times so as to turn on the motor on-off relay to supply the electric power to the motor after the pinion gear is moved by the solenoid switch to the ring gear and then engages the ring gear at least partially or to a maximum movable position where engagement of the pinion gear with the ring gear is to be established and then engages the ring gear, and after the main contacts are closed.

The controller energizes the motor on-off sub-relay to open the motor on-off relay before the main contacts are closed by the solenoid switch and then closes the motor on-off relay following the first operation time.

When it is requested to restart the engine, the engine start system of this invention works to electrically or mechanically delay the second operation time when the motor on-off relay is to be energized until the first operation time when the solenoid switch is to be energized. Specifically, the delay means works to close the motor on-off relay to supply the electric power to the motor after the pinion gear is moved by the solenoid switch and engages the ring gear.

The controller energizes the motor on-off sub-relay to turn off the motor on-off relay before the main contacts are closed by the solenoid switch and then turn on the motor on-off relay following the first operation time.

When it is requested to restart the engine during deceleration of the engine prior to stop thereof, the engine start system electrically or mechanically delays the second operation time when the motor on-off relay is to be energized until after the first operation time when the solenoid switch is to be energized. Specifically, the delay means works to close the motor on-off relay to supply the electric power to the motor after the pinion gear is moved by the solenoid switch and engages the ring gear at least partially.

The motor on-off relay is of a normally closed type. Therefore, the motor on-off sub-relay is energized to turn off the motor on-off relay before the solenoid switch closes the main contacts, after which the motor on-off relay is turned on after the first operation time has been reached.

Therefore, the motor on-off relay is not closed to keep the motor deenergized during a period of time required by the pinion gear to move to the ring gear and then engages the ring gear. Therefore, the torque, as produced by the motor, is not transmitted to the pinion gear until the pinion gear engages the ring gear.

The use of the normally closed type of the motor on-off relay permits the engine to be started by, for example, a manual key operation made by a vehicle operator if the controller has failed in operation. Specifically, the solenoid switch is activated in response to a normal input which is produced by manual turning on of an ignition switch to excite the starter relay independently of the controller.

Even if the pinion gear, as moved by the solenoid switch, has failed to engage the ring gear directly, that is, the end of the pinion gear has hit the end surface of the ring gear (usually, the probability that the end of the pinion gear hits the end surface of the ring gear is higher than that the pinion gear is moved by the solenoid switch and then engages the ring gear directly), the pinion gear will then engage the ring gear at a certain angular position because the engine is decelerating, so that the ring gear is rotating at a lower speed. This enables the engine to be restarted quickly during deceleration of the engine before complete stop thereof. The motor is kept off until the pinion has engaged the ring gear, thus minimizing the mechanical impact or noise arising from the engagement of the pinion gear with the ring gear and improving the reliability in engagement with the ring gear during the deceleration of the engine and durability of the system.

The motor on-off relay may have the relay contacts in the motor circuit upstream of the external terminal. Specifically, the motor on-off relay is disposed between the solenoid switch and the battery, thus eliminating the need for altering the structure of the solenoid switch, that is, permitting the solenoid switch having a typical structure to be used.

The motor on-off relay may be installed on a housing of a starter in which the motor is installed. The starter is a part to be installed on the engine. It is, thus, essential to assure the quality of the starter against mechanical vibrations. In order to meet such quality assurance, the motor on-off relay is secured to the starter housing which is close to an engine mount and smallest in magnitude of the vibration.

The engine start system may be installed in a vehicle equipped with an idle stop system working to stop and restart the engine automatically.

According to the eighth aspect of the invention, there is provided an engine start system which comprises: (a) a motor which is energized by supply of electric power from a battery through a motor circuit to produce torque; (b) an output shaft which rotates when subjected to the torque, as produced by the motor; (c) a pinion gear through which the torque, as produced by the motor, is transmitted to a ring gear coupled to an engine; (d) a pinion movable body which is movable along the output shaft together with the pinion gear; (e) a solenoid switch which works to produce a magnetic attraction to attract a plunger to thrust the pinion gear toward the ring gear and also open or close main contacts installed in the motor circuit interlocking with movement of the plunger for cutting or supplying the electric power to the motor; (f) a motor on-off relay which has relay contacts disposed in the motor circuit and opens or closes the relay contacts electrically; and (g) a controller which electrically controls an operation of the solenoid switch and an operation of the motor on-off relay. During deceleration of the engine prior to stop of the engine, the controller energizes the solenoid switch to move the pinion gear and delays the operation of the motor on-off relay until after the pinion bear engages the ring gear at least partially or the pinion is moved to a maximum movable position wherein engagement of the pinion gear with the ring gear is to be established and then engages the ring gear, and the main contacts are closed, after which an engine restart request signal is inputted to the controller.

When the engine is decelerating prior to stop of the engine, the engine start system of this invention thrusts and brings the pinion gear into engagement with the ring gear of the engine and then energizes the motor on-off relay to activate the motor to crank the engine in response to the engine restart request signal inputted to the controller, that is, when engine restart conditions are met. In other words, the controller does not turn on the solenoid switch to bring the pinion gear into engagement with the ring gear in response to the engine restart request signal, but achieves the engagement of the pinion gear with the ring gear while the engine is decelerating before being stopped and keeps such engagement after the engine stops.

Afterwards, when the engine restart conditions are met, for example, the vehicle operator has released the brake pedal and shifted the select lever of the automatic transmission to the drive, the engine restart signal is inputted to the controller. The controller then energizes the motor on-off relay to supply the electric power from the battery to the motor to rotate the pinion gear which has already engaged the ring gear. The torque produced by the motor is, therefore, transmitted quickly to the ring gear to crank the engine. This minimizes the mechanical impact or noise arising from the engagement of the pinion gear with the ring gear.

In the preferred mode of the invention, the motor on-off relay has the relay contacts in the motor circuit upstream of the external terminal. Specifically, the motor on-off relay is disposed between the solenoid switch and the battery, thus eliminating the need for altering the structure of the solenoid switch, that is, permitting the solenoid switch having a typical structure to be used.

The motor on-off relay may be installed on a housing of a starter in which the motor is installed. The starter is a part to be installed on the engine. It is, thus, essential to assure the quality of the starter against mechanical vibrations. In order to meet such quality assurance, the motor on-off relay is secured to the starter housing which is close to an engine mount and smallest in magnitude of the vibration.

The engine start system may be installed in a vehicle equipped with an idle stop system working to stop and restart the engine automatically.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
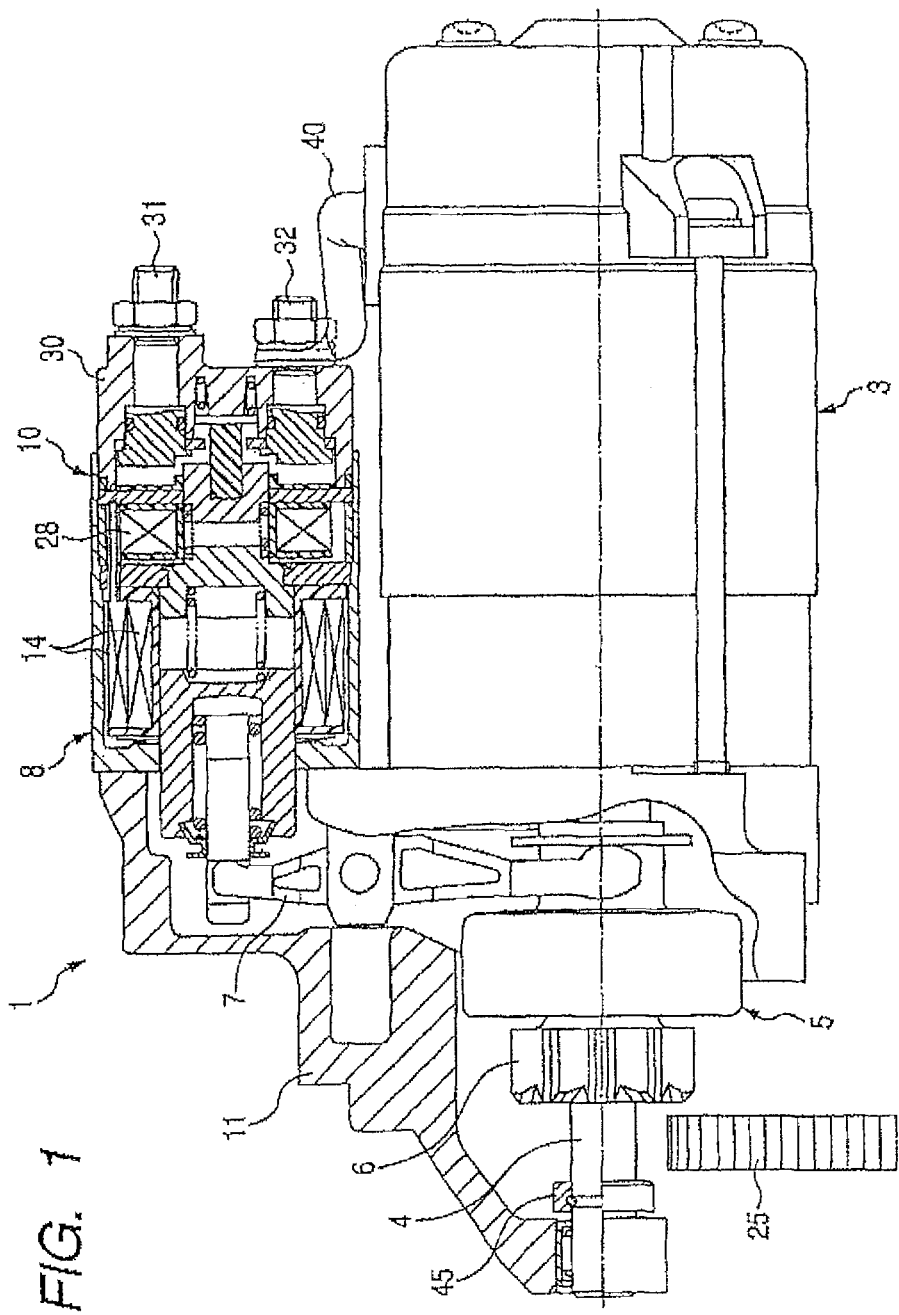
FIG. 1 is a partially sectional view which shows a starter installed in an engine start system according to the first embodiment of the invention.
Figure 3:
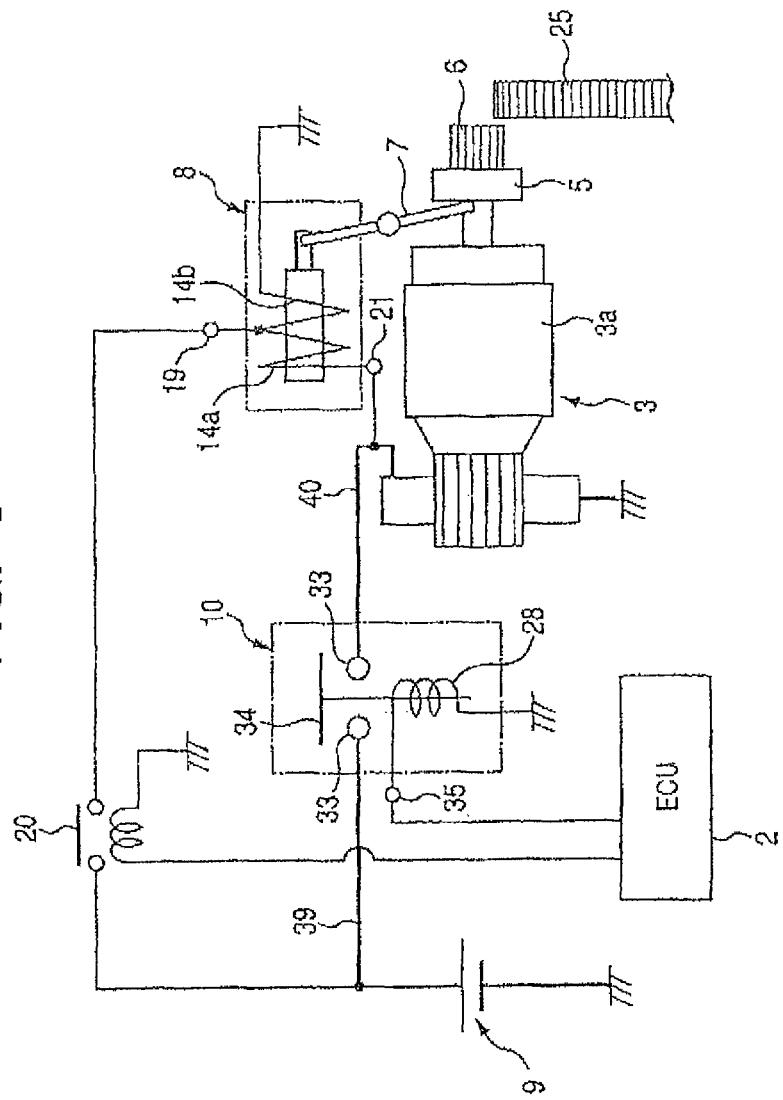
FIG. 3 is a circuit diagram which shows an engine start system according to the first embodiment of the invention.

Referring to the drawings, wherein like reference numbers refer to like parts in several views, particularly to FIG. 3, there is shown an engine start system according to the first embodiment of the invention which may be used with an idle stop system to stop an automotive engine automatically when a vehicle has stopped, for example, at an intersection or due to a traffic jam and then restart the engine when a vehicle driver performs a given starting operation (e.g., release of the driver's foot from the brake pedal). The engine start system includes an engine starter 1, as illustrated in FIG. 1, and an electronic control unit (ECU) 2 which controls an operation of the starter 1.

The starter 1 consists essentially of a starter motor 3, an output shaft 4 through which torque, as produced by the motor 3 is transmitted, a one-way clutch 5 fit on the outer periphery of the output shaft 4 through a helical spline, a pinion gear 6 movable on the outer periphery of the output shaft 4 in an axial direction thereof (i.e., a lateral direction in FIG. 1) along with the one-way clutch 5, a solenoid actuator 8 working as a pinion actuator to push the clutch 5 and the pinion gear 6 away from the motor 3 through the shift lever 7, and a solenoid motor on-off switch 10 working to open or close main contacts, as will be described later, installed in a motor circuit which is configured to supply the electric power or current to the motor 3. The one-way clutch 5 is of a typical structure made of an outer, an inner, rollers, and springs.

The pinion gear 6 is formed integrally with the inner of the one-way clutch 5. The pinion gear 6 and the one-way clutch 5 work as a pinion movable body. A speed reducer (not shown) may be disposed between the motor 3 and the output shaft 4 to reduce the speed of the motor 3 and transmit it to the output shaft 4. The speed reducer may be implemented by an epicycle reduction gear.

The structure of the solenoid actuator 8 and the motor on-off switch 10 will be described below with reference to FIGS. 2 and 3.

The motor 3, the output shaft 4, the clutch 5, the pinion gear 6, the shift lever 7, the starter housing 11, and the speed reducer have typical structures known in the art which are not essential parts of the invention, and explanation thereof in detail will be omitted here.

The solenoid actuator 8 and the motor on-off switch 10 are aligned or disposed in series in an axial direction thereof as a unit and, as can be seen from FIG. 1, secured to the starter housing 11 in parallel to the starter motor 3.

Figure 2:
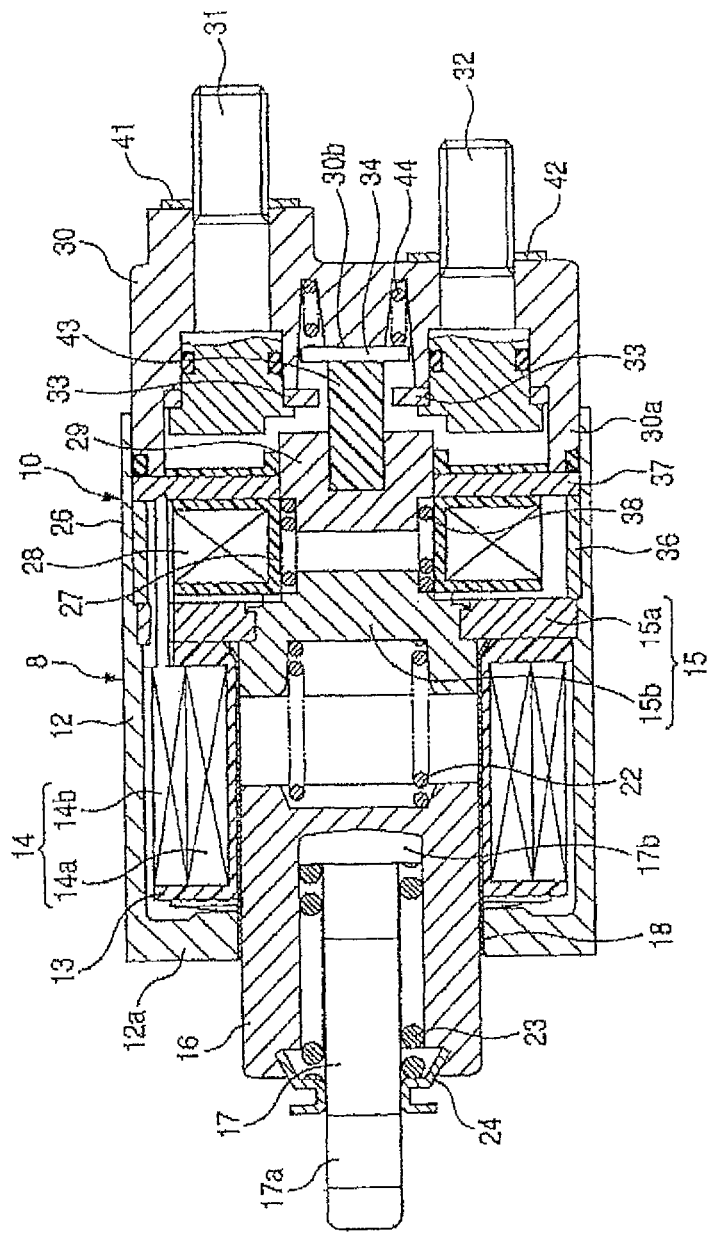
FIG. 2 is a longitudinal sectional view which shows an internal structure of a solenoid actuator and a solenoid relay installed in the starter of FIG. 1.

The solenoid actuator 8, as illustrated in FIG. 2, consists of a solenoid case 12, a solenoid coil 14 wound around a resinous bobbin 13 within the solenoid case 12, a stationary magnetic core 15 to be magnetized by energization of the solenoid coil 14, a plunger 16 disposed to be movable in the solenoid coil 14 in an axial direction thereof, and a joint 17 through which the movement of the plunger 16 is transmitted to the shift lever 7.

The solenoid case 12 is made of a hollow cylinder with a bottom 12a closing one of opposed ends thereof. The bottom 12a has formed in the radial center thereof a circular hole whose diameter is identical with an inner diameter of the bobbin 13. A hollow cylindrical sleeve 18 is inserted into the inner periphery of the bobbin 13 through the circular hole of the bottom 12a to guide the movement of the plunger 16.

The solenoid coil 14 is made up of a pull-in coil 14a and a hold-on coil 14b which are wound around the bobbin 13 in the form of two layers. The pull-in coil 14a and the hold-on coil 14b are joined at ends thereof to a first external terminal 19, as illustrated in FIG. 3. The first external terminal 19 is connected to the battery 9 through a starter relay 20. The pull-in coil 14a is also connected at the other end thereof to a second external terminal 21, as illustrated in FIG. 3. The second external terminal 21 is coupled to an M-terminal bolt 32, as will be described later in detail, through a metal connector (not shown). The hold-on coil 14b is also welded at the other end thereof to the surface of the magnetic core 15 so that it is electrically connected to ground.

The starter relay 20 is turned on or off by the ECU 2. When turned on, the starter relay 20 supplies the electric power from the battery 9 to the solenoid coil 14.

The stationary magnetic core 15 is made by an assembly of an annular plate 15a and a core 15b swaged so that it is fit in the inner periphery of the annular plate 15. The plate 15a has an outer peripheral edge facing the solenoid coil 14 which is placed in abutment with an inner shoulder formed in the inner wall of the solenoid case 12 so that it is held from moving to the solenoid coil 14.

The plunger 16 is disposed to be movable along the inner periphery of the sleeve 18 in the axial direction of the sleeve 18. A return spring 22 is interposed between the core 15 and the plunger 16 to urge the plunger 16 away from the core 15 (i.e., the left direction, as viewed in FIG. 2). The plunger 16 is made of a hollow cylinder with a circular center hole extending in the axial direction of the plunger 16. The center hole opens at one of ends of the plunger 16 and is closed by the other end of the plunger 16.

The joint 17 is inserted into the center hole of the plunger 16 along with a drive spring 23. The joint 17 is made of a bar and has formed in an end thereof a groove 17*a* with which an end of the shift lever 7 engages. The joint 17 also has a flange 17*b* formed on the other end thereof. The flange 17*b* has an outer diameter so as to have an outer periphery thereof placed in slidable contact with the inner wall of the center hole of the plunger 16. The flange 17*b* is urged by the drive spring 23 into constant abutment with the bottom of the center hole of the plunger 16.

The drive spring 23 is disposed around the outer periphery of the joint 17 and held at an end thereof by a spring support 24 which is swaged or fit on an inner wall of an opening of the plunger 16 and at the other end thereof by the flange 17*b* of the joint 17. The drive spring 23 continues to be compressed until the end of the pinion gear 6 pushed by the end of the shift lever 7 moved away from the starter motor 3 by the plunger 16 hits the end of the ring gear 25 joined to the crankshaft of the engine, after which the plunger 16 starts to be attracted by the core 15*b*, thereby building up or accumulating reactive force therein which serves to bring the pinion gear 6 into meshing engagement with the ring gear 25.

The motor on-off switch 10 has the magnetic core 15 shared with the solenoid actuator 8 and is formed integrally with the solenoid actuator 8. The motor on-off switch 10 also includes a hollow cylindrical relay case 26, a relay coil 28, a movable core 29, a contact cover 30, terminal bolts 31 and 32, a pair of fixed contacts 33, and a movable contact 34. The relay case 26 is formed integrally with the solenoid case 112 and extends from an open end of the solenoid case 112 in alignment therewith. The relay coil 28 is wound around a resinous bobbin 27. The movable core 29 is disposed inside the relay coil 28 to be movable in an axial direction of the relay coil 28. The contact cover 30 is made of resin and fit in an open end of the relay case 26. The terminal bolts 31 and 23 are installed in the contact cover 30. The fixed contacts 33 are connected electrically to the motor circuit (i.e., circuit components of the motor on-off switch 10) through the terminal bolts 31 and 32. The movable contact 34 is disposed inside the contact cover 30 to be movable to establish or block an electric connection between the fixed contacts 33.

The relay coil 28 is located inside the inner periphery of the relay case 26 closer to the end of the relay case 26 than the plate 15*a* of the magnetic core 15. Specifically, the solenoid coil 14 is located across the plate 15*a* from the relay coil 28. The relay coil 28 is, as illustrated in FIG. 3, joined at an end thereof to a third terminal 35 and at the other end thereof to the surface of the magnetic core 15 so that it is electrically connected to ground. The third terminal 35 is connected to the ECU 2 through an electric line.

A spacer 36 is disposed on the outer periphery of the relay coil 28. A magnetic plate 37 is disposed adjacent one of the end surfaces of the relay coil 28 which is located farther away from the plate 15*a*.

The spacer 36 is made of a hollow cylinder and fit in the inner circumference of the relay case 26 without any air gap. The spacer 36 is placed in abutment of an end thereof with the end surface of the plate 15*a* so that it is held from moving toward the plate 15*a*.

The magnetic plate 37 is insert-molded in resin material by which the bobbin 27 is formed. The magnetic plate 37 extends perpendicular to the axis of the spacer 36 and is placed with an outer peripheral edge extending outside the resin material in contact abutment with the end of the spacer 36 so that it is held from moving toward the spacer 36. The magnetic plate 37 has formed therein a circular center hole whose inner diameter is substantially identical with that of the bobbin 27 so that the movable core 29 may move through the center hole.

The movable core 29 is disposed to be movable along the inner peripheries of the magnetic plate 37 and the bobbin 27 in the axial direction thereof. A return spring 38 is disposed between the core 15*b* and the movable core 29 to urge the movable core 29 elastically away from the core 15*b* (i.e., the right direction, as viewed in FIG. 2).

The contact cover 30 is of a cylindrical shape and includes a hollow cylindrical leg 30*a* which is disposed in the opening of the relay case 26 with an end thereof in contact abutment with the surface of the magnetic plate 37. The entire or partial circumference of the open end of the relay case 26 is crimped to retain the leg 30*a* of the contact cover 30 firmly.

The terminal bolts 31 and 32 serve as a B-terminal bolt to which a battery cable 39 is, as illustrated in FIG. 3, is joined and an M-terminal bolt to which a motor lead 40 is, as illustrated in FIGS. 1 and 3, joined. The terminal bolts 31 and 32 are installed in the contact cover 30 through washers 41 and 42.

The fixed contacts 33 are separate from the terminal bolts 131 and 132, but may alternatively be formed integrally therewith, respectively. The fixed contacts 33 are electrically connected to the terminal bolts 31 and 32 within the contact cover 30, respectively.

Figure 9:
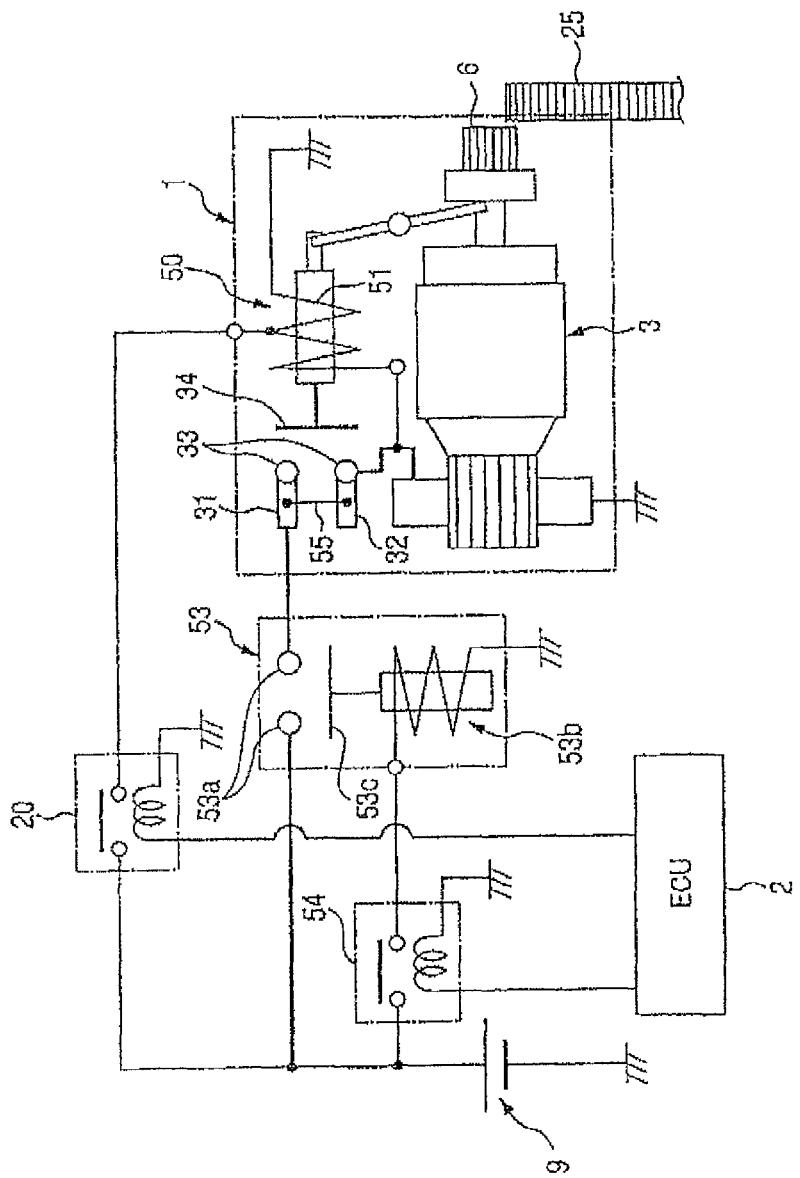
FIG. 9 is a circuit diagram which shows an engine start system according to the sixth embodiment of the invention.

The movable contact 34 is disposed farther away from the movable core 29 than the fixed contacts 33. The movable contact 34 is urged by a contact pressure spring 44 into constant abutment with an end surface of a resinous rod 43 secured in the movable core 29. An initial spring pressure, as produced by the contact pressure spring 44, is set smaller than that, as produced by the return spring 38, thus causing the movable contact 34 to be placed, as can be seen in FIG. 9, in constant abutment with an inner seat 30*b* of the contact cover 30 while compressing the contact pressure spring 44 when the relay coil 28 is deenergized.

The main contacts are the fixed contacts 33 and the movable contact 34. The closing of the main contacts is achieved by urging the movable contact 34 through the contact pressure spring 44 into abutment with the fixed contacts 33 to make an electric connection between the fixed contacts 33. The opening of the main contacts is achieved by moving the movable contact 34 away from the fixed contacts 33 to break the electric connection between the fixed contacts 33.

The idle stop control mode to be performed by the ECU 2 will be described below.

When the ECU 2 monitors, for example, signals indicating the speed of the engine, the position of the selector lever of the automatic transmission, and an on/off state of the brake switch, as inputted from an engine ECU (not shown), and determines based on the signals that automatic engine stop conditions, for example, where the vehicle speed is zero (0), and the brake pedal has been depressed have been met, the ECU 2 outputs an engine stop request signal to the engine ECU.

Afterwards, when engine restart conditions, for example, where the brake pedal has been released, and the select lever of the automatic transmission has been shifted to a drive (D) range are met, the ECU 20 decides that a request to restart the engine is made after the idle stop control mode has been executed, and outputs an engine restarting signal to the engine ECU and also controls the operation of the starter 1 to restart the engine.

Specifically, the ECU 2 energizes the solenoid coil 14 to turn on the solenoid actuator 8, and then energizes the relay coil 28 to operate the motor on-off switch 10. The first operation time at which the ECU 2 should energize the solenoid coil 14 is delayed a preselected period of time until after the second operation time at which the ECU 2 should energize the relay coil 28. The time lag between the first and second operation times is changed between when the engine restart conditions are met after the automatic engine stop conditions are met to cut the supply of fuel and intake air to the engine, and then the engine stops completely and when the engine restart conditions are met before the engine stops completely.

For example, when the engine restart conditions are met after the engine stops completely, the time lag is set to 15 ms. to 20 ms. (in this embodiment, 20 ms.). When the engine restart conditions are met before the engine stops completely, that is, while the ring gear 25 is rotating, the time lag is set to 30 ms. or more, preferably 40 ms. or more.

When a time interval between when the pinion gear 6 has been thrust by the solenoid actuator 8 along with the clutch 5 toward the ring gear 25 and when the main contacts are closed by the motor on-off switch 10, that is, the above time lag is set to 20 ms., the ECU 2 will close the main contacts to energize the starter motor 3 substantially concurrently with when the end of the pinion gear 6 hits the end surface of the ring gear 25. When the time lag is set to 30 ms. or more, the ECU 2 will keep the main contacts opened until the pinion gear 6 advances to an engageble position where the pinion gear 6 is engable with the ring gear 25 and then engages the ring gear 25 and then close them after the pinion gear 6 has engaged the ring gear 25. The phrase "until the pinion gear 6 advances to the engageble position and then engages with the ring gear 25" does not necessarily mean "until the ring gear 13 has engaged the entire width of the ring gear 25 completely", but it contains the meaning of "until the pinion gear 6 at least partially engages the width of the ring gear 25.

The operation of the starter 1 in the first embodiment will be described below.

When Normal Engine Start is Made (Vehicle Operator Turns on Ignition Switch to Start Completely Stopped Engine)

In response to an on-signal produced upon turning on of the ignition switch, the ECU 2 turns on the starter relay 20, so that the electric power is supplied from the battery 9 to the solenoid coil 14 to magnetize the core 15b, thereby attracting the plunger 16. This causes the pinion gear 6 to be thrust by the shift lever 7 away from the starter motor 3 along with the one-way clutch 5. When hitting the end surface of the ring gear 25, the pinion gear 6 stops.

When the time lag (e.g., 20 ms.) has elapsed following the energization of the solenoid coil 14, the ECU 2 energizes the relay coil 28 to attract the movable core 29 to the core 15b of the magnetic core 15, thereby causing the movable contact 34 to be urged by the contact pressure spring 44 into abutment with the fixed contacts 33 to make the electric connection therebetween (i.e., close the main contacts), so that the electric power is supplied form the battery 9 to the starter motor 3. This causes the armature 3a, as illustrated in FIG. 3, to produce torque which is, in turn, transmitted to the pinion gear 6 through the output shaft 4 and the one-way clutch 5. When the pinion gear 6 rotates until an engageble position where it is engageble with the ring gear 25, it will cause the pinion 6 to be brought by the reactive pressure, as accumulated in the drive spring 23, into engagement with the ring gear 25, so that the torque is transmitted from the pinion gear 6 to the ring gear 25 to crank the engine.

When Engine Restart is Made after Idling of Engine is Required to be Stopped

When the engine restart conditions are met after the rotation of the engine is stopped completely, the ECU 2 turns on the starter relay 20 to energize the solenoid coil 14. After an elapse of 20 ms. from the first operation time, the ECU 2 energizes the relay coil 28, thereby thrusting the pinion gear 6 away from the starter motor 3 through the shift lever 7 along with the one-way clutch 5. The ECU 2 also energizes the starter motor 3 substantially at the same time as a hit of the end of the pinion gear 6 with the end surface of the ring gear 25. This causes the pinion gear 6 to be rotated by the torque output from the starter motor 3 to an angular position (i.e., the engageble position) and then engage the ring gear 25 to crank the engine.

When the engine restart conditions are met before the rotation of the engine is stopped completely, the ECU 2 turns on the relay coil 28 after an elapse of the time lag (e.g., 40 ms.) since the first operation time. At the time when the end of the pinion gear 6 hits the end surface of the ring gear 25, the main contacts are not yet closed, so that the starter motor 3 is still in the off-state, and the pinion gear 6 is not rotated. However, the pinion gear 6 has been thrust to the ring gear 25 while the ring gear 25 is rotating, thus causing the engagement of the pinion gear 6 with the ring gear 25 to be achieved when the pinion gear 6 has hit the ring gear 25 and then rotated toward the engageble position at which the pinion gear 6 is to engage the ring gear 25. Afterwards, the ECU 2 turns on the motor on-off switch 10 to close the main contacts, so that the starter motor 3 is actuated to output the torque to the pinion gear 6 to crank the engine through the ring gear 25.

The engine start system of this embodiment has the following advantages.

When the engine restart conditions are met after the idle stop request is made to cut the supply of fuel and intake air to the engine, but the engine is still decelerating (e.g., the engine is swinging or oscillating in rotation, that is, the engine is rotating in the normal and the reverse direction cyclically), the engine start system actuates the starter 1 to restart the engine. The ECU 2 produces the time lag between the first operation time and the second operation time so as to keep the start motor 3 turned off until the pinion gear 6 meshes with the ring gear 25. For example, the second operation time is delayed 30 ms. or more (preferably 40 ms. or more) until after the first operation time, thereby keeping the starter motor 3 in the off-state until the pinion gear 6 meshes with the ring gear 25, thereby minimizing mechanical impact or noise arising from the engagement of the pinion gear 6 with the ring gear 25 to ensure the reliability in operation and the service life of the starter 1.

Figure 4:
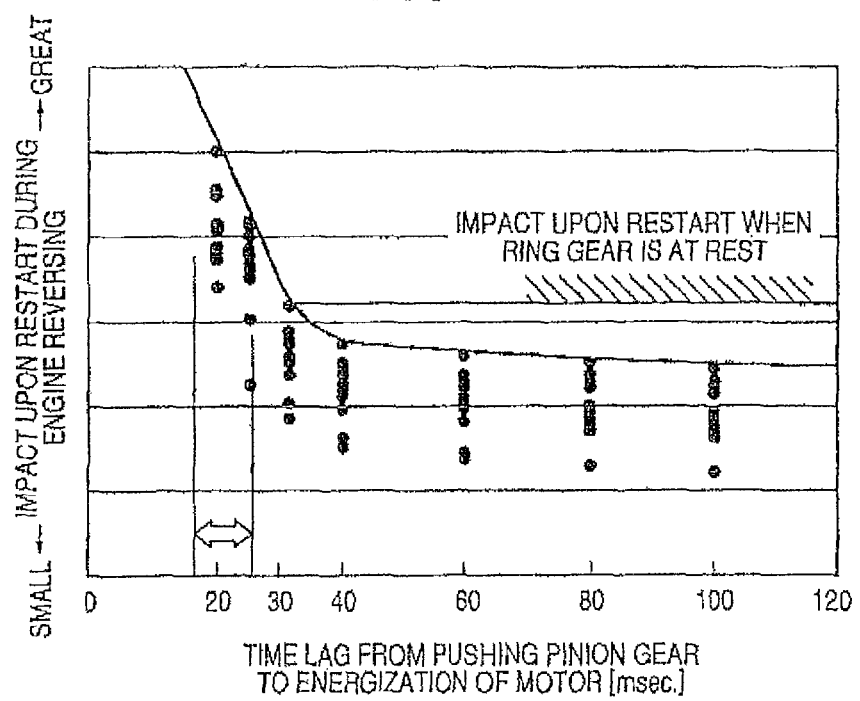
FIG. 4 is a graph which demonstrates a relation between the magnitude of impact arising from engagement of a pinion gear with a ring gear while an engine is being reversed and a time lag elapsed from movement of a pinion gear.

We measured the relation between the magnitude of mechanical impact arising from the engagement of the pinion gear 6 with the ring gear 25 and the time lag set between the first and second operation times. Results of such measurement are shown in a graph of FIG. 4. The vertical axis indicates the magnitude of impact appearing when the pinion gear 6 meshes with the ring gear 25 while the ring gear 25 is rotating at a constant speed in a reverse direction. The horizontal axis indicates the time interval between when the pinion gear 6 is pushed by the shift lever 7 and when the starter motor 3 is energized, that is, the time lag between the first and second operation times.

"Standard starter" in the graph represents typical pinion-thrusting starters designed to thrust the pinion gear 6 through a single solenoid switch to open or close the main contacts. The range, as delimited by an arrow, indicates a time interval of about 15 ms. to 25 ms. between when the pinion gear 6 is thrust and when the starter motor 3 is energized, in other words, the time lag between the energization of the solenoid switch and closing of the maim contacts. In the case where the time lag is 15 ms. to 25 ms., the standard starter energizes the starter motor 3 substantially at the same time as the pinion gear 6 hits the ring gear 25, which may cause the pinion gear 6 rotating in the normal direction to mesh with the ring gear 25 rotating in the reverse direction, thus producing a great impact.

When the time lag between the thrusting of the pinion gear 6 and the energization of the starter motor 3 is 30 ms. or more, it will cause the starter motor 3 to be energized when the pinion gear 6 is placed in mesh with the ring gear 25. In this case, the torque, as produced by the starter motor 3, is not exerted on the pinion gear 6 at the time when the pinion gear 6 engages the ring gear 25, thus resulting in a decrease in mechanical impact produced upon the engagement of the pinion gear 6 with the ring gear 25. Particularly, when the time lag is 40 ms. or more, the magnitude of the impact has found to be lower than that when the ring gear 25 is stopped, and the engine starts.

As apparent from the above discussion, the use of the time lag of 30 ms. or more (preferably 40 ms. or more) between the first and second operation times will result in a decrease in level of impact airing from the engagement of the pinion gear 6 with the ring gear 25. This avoids the damage to the pinion gear 6 and the ring gear 25 even when the starter 1 is actuated during the deceleration of the engine (e.g., the swinging in rotation of the engine) before the engine stops completely. Therefore, when it is required to restart the engine while the engine is still decelerating immediately after the vehicle stops, the engine start system works to restart the engine quickly without causing trouble to following vehicles, thus eliminating the mental load on the vehicle operator.

The engine start system of this embodiment is, as described above, designed to use the time lag between the first and second operation times which is different between a first restart mode in which the engine is restarted after the rotation of the engine stops completely and a second restart mode in which the engine is restarted before the rotation of the engine stops completely. It is, therefore, possible to set the time lags to values suitable for the first and second restart modes independently. The time lags in the first and second restart modes may alternatively be selected to have the same value (e.g., 30 ms. or more, preferably 40 ms. or more).

The time lag may also be determined so as not to energize the relay coil 28 of the motor on-off switch 10 until, after the solenoid coil 14 of the solenoid actuator 8 is energized, the pinion gear 6 advances from a rest position, as illustrated in FIG. 1, at which the starter motor 3 is at rest to a maximum movable position and then engages the ring gear 25, in other words, so as to energize the relay coil 28 after the pinion gear 6 is thrust to the maximum movable position and then engages the ring gear 25. The maximum movable position is the position where one of the opposed ends of the pinion gear 6 which is farther from the one-way clutch 5 abuts or hits the end surface of the pinion stopper 45, as illustrated in FIG. 1, which is fit on the outer periphery of the output shaft 4, in other words, the position where the pinion gear 6 is engageble with the ring gear 25, that is, the engagement of the pinion gear 6 with the ring gear 25 is to be established. When the pinion gear 6 has been placed in abutment with the pinion stopper 45, it means the fact that the pinion gear 6 has engaged the entire width of the ring gear 25 completely, in other words, the complete engagement of the pinion gear 6 with the ring gear 25 is achieved.

The solenoid actuator 8 and the motor on-off switch 10 are, as described above, arrayed in series in the axial direction thereof (i.e., the motor 3) as a unit, thereby resulting in a decrease in area of the starter 1 projected in the axial direction as compared with when they are arranged radially of the motor 3. In other words, it results in a decrease in size of the motor 3 in radial directions thereof. This permits the starter 1 to be installed in substantially the same sized space as when a single solenoid switch (e.g., the solenoid switch 50 in FIG. 7) is used to thrust the pinion gear 6 and open or close the main contacts of the motor circuit.

The solenoid actuator 8 and the motor on-off switch 10 share the magnetic core 15 with each other which is disposed between the solenoid coil 14 and the relay coil 28. The solenoid case 12 and the relay case 26 are formed integrally and arrayed in alignment with the axial direction of the solenoid actuator 8 (i.e., the motor 3). This results in decreases in part and assembling process of the starter 1. The integral formation of the solenoid case 12 and the relay case 26 enhances the resistance to external mechanical vibrations.

Figure 5:
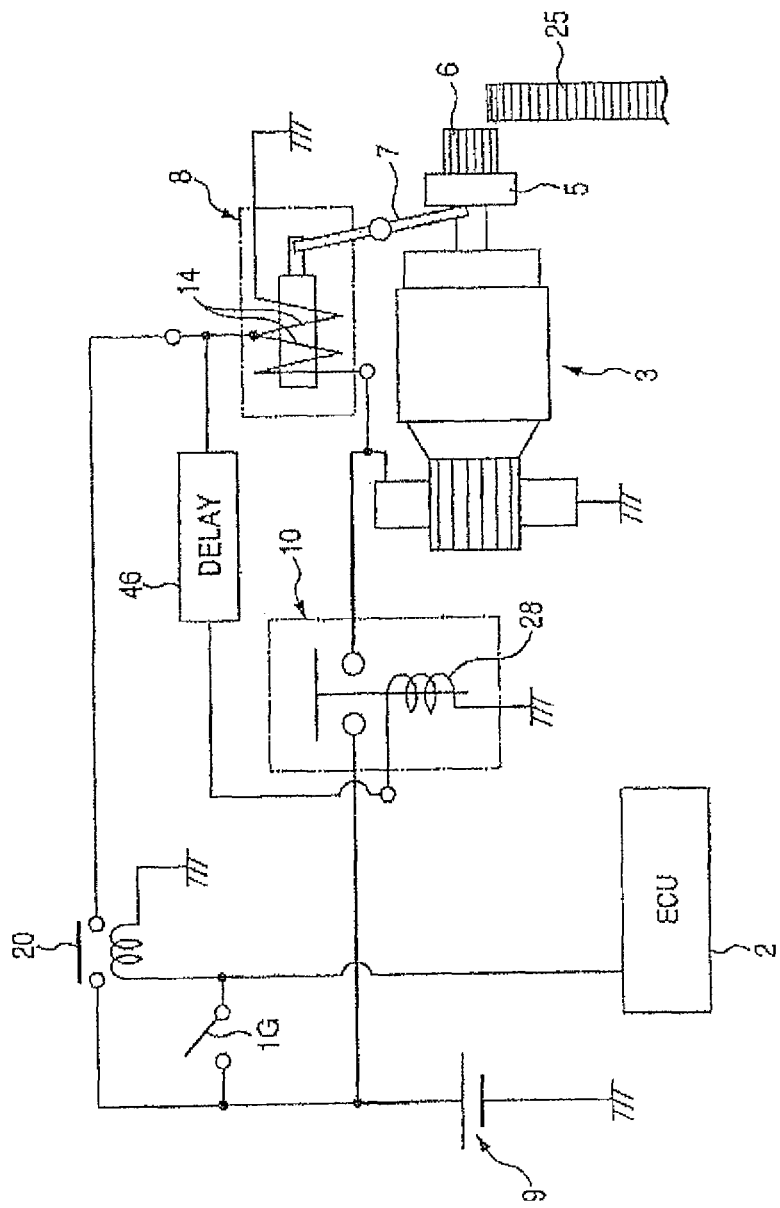
FIG. 5 is a circuit diagram which shows an engine start system according to the second embodiment of the invention.

FIG. 5 illustrates an engine start system according to the second embodiment of the invention.

The engine start system of the first embodiment is designed to control the first operation time and the second operation time through the ECU 2, while the engine start system of this embodiment is designed to control the time lag between the first and second operation times using a delay circuit 46.

The delay circuit 46 is, as can be seen in FIG. 5, connected between an electric line extending from the starter relay 20 to the solenoid coil 14 and the relay coil 28. When the ECU 2 turns on the starter relay 20, the delay circuit 46 delays the energization of the relay coil 28 (i.e., the second operation time) for a given period of time (e.g., 40 ms.) until after the energization of the solenoid coil 14 (i.e., the first operation time).

Specifically, the delay circuit 46 works to keep the start motor 3 in the off-state until the pinion gear 6 engages the ring gear 25, thus minimizing the mechanical impact arising from the engagement of the pinion gear 6 with the ring gear 25, which ensures the reliability in operation and durability of the starter 1.

The use of the delay circuit 46 to set the lag time between the first and second operation times permits the ECU 2 only to control an on-off operation of the starter relay 20 when it is required to actuate the starter 1, thus eliminating the need for increasing ports of the ECU 2 and permitting the ECU 2 to have a typical structure.

Figure 6:
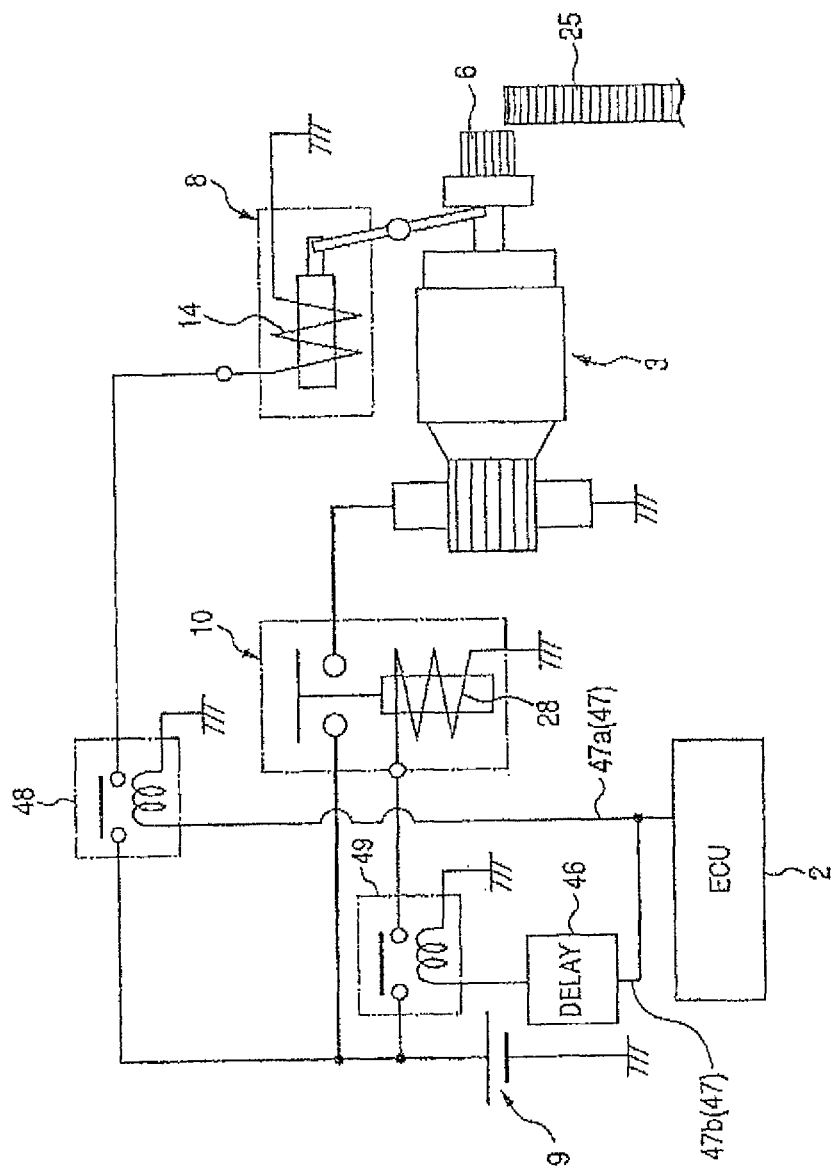
FIG. 6 is a circuit diagram which shows an engine start system according to the third embodiment of the invention.

The third embodiment of the invention will be described below with reference to FIG. 6 which is a modification of the second embodiment.

Specifically, the engine start system of this embodiment is different from that of the second embodiment in structure of the delay circuit 46 which sets the time lag between the first and second operation times.

A single electric wire 47 extends from an output port of the ECU 2 and connects with two branch lines: a first relay wire 47a and a second relay wire 47b. The first relay wire 47a leads to a first relay 48. The second relay wire 47b leads to a second relay 49 through the delay circuit 46.

The first relay 48 is identical in operation and structure with the starter relay 20 of the first embodiment, as illustrated in FIG. 3, and disposed as a component part in an excitation circuit which supplies an excitation current from the battery 9 to the solenoid actuator 8. The second relay 49 is disposed as a component part in an excitation circuit (not shown in the first embodiment) which supplies an excitation current from the battery 9 to the motor on-off switch 10.

The delay circuit 46 is connected to the second relay wire 47b and, when the ECU 2 outputs the excitation current (i.e., an on-signal) to the starter relay 20, functions to delay the energization of the second relay 49 (i.e., the second operation time) for a given period of time (e.g., 40 ms.) until after the energization of the first relay 48 (i.e., the first operation time).

The structure of this embodiment eliminates the need for discrete connections of the first relay wire 47a and the second relay wire 47b to different output ports of the ECU 20. In other words, the first and second relay wires 47a and 47b are joined through the single electric line 47 to the output port of the ECU 20.

Additionally, there is no need to supply as great a current as that to the solenoid actuator 8 to the first and second relay wires 47a and 47b. The amount of current required only to excite the first and second relays 48 and 49 flows through the first and second relay wires 47a and 47b, thus permitting the first and second relay wires 47a and 48b to be made by a low-power thin wire, which leads to a decrease in manufacturing cost of the system.

The fourth embodiment of the invention will be described below with reference to FIG. 7.

The pinion-push starter 1 of this embodiment is designed to push the pinion gear 6 and close the main contacts using a single solenoid switch 50.

The solenoid switch 50 is disposed in the starter 1 and includes a switch coil 51 and a plunger 52. When energized, the switch coil 51 functions as an electromagnet to produce magnetic attraction to attract the plunger 52. The plunger 52 is disposed to be slidable within the solenoid switch 50 in an axial direction thereof to thrust the pinion 6 toward the ring gear 25 and also close the main contacts simultaneously or interlocking with the movement of the plunger 52. A stroke of the plunger 52, that is, a distance the plunger 52 is to be moved is so determined that the main contacts are closed substantially at the same time as the end of the pinion gear 6 hits the end surface of the ring gear 25.

In this embodiment, the stroke of the plunger 52 is lengthened more than the typical one so that the second operation time when the main contacts are closed may be delayed until after the first operation time when the pinion gear 6 hits the ring gear 25. Such a time lag is, like in the first embodiment, 30 ms. or more, preferably 40 ms. or more.

Specifically, when it is required to restart the engine after the idle stop request is made, the starter 1 of this embodiment designed to thrust the pinion gear 6 and also close the main contacts using the solenoid switch 50 works to actuate the starter motor 3 after the pinion gear 6 meshes with the ring gear 25. Therefore, even when it is requested to restart the engine while the engine is still decelerating, the torque, as produced by the starter motor 3, is not exerted on the pinion gear 6 at the time when the pinion gear 6 engages the ring gear 25, thus resulting in a decrease in mechanical impact or noise produced upon the engagement of the pinion gear 6 with the ring gear 25.

Figure 7:
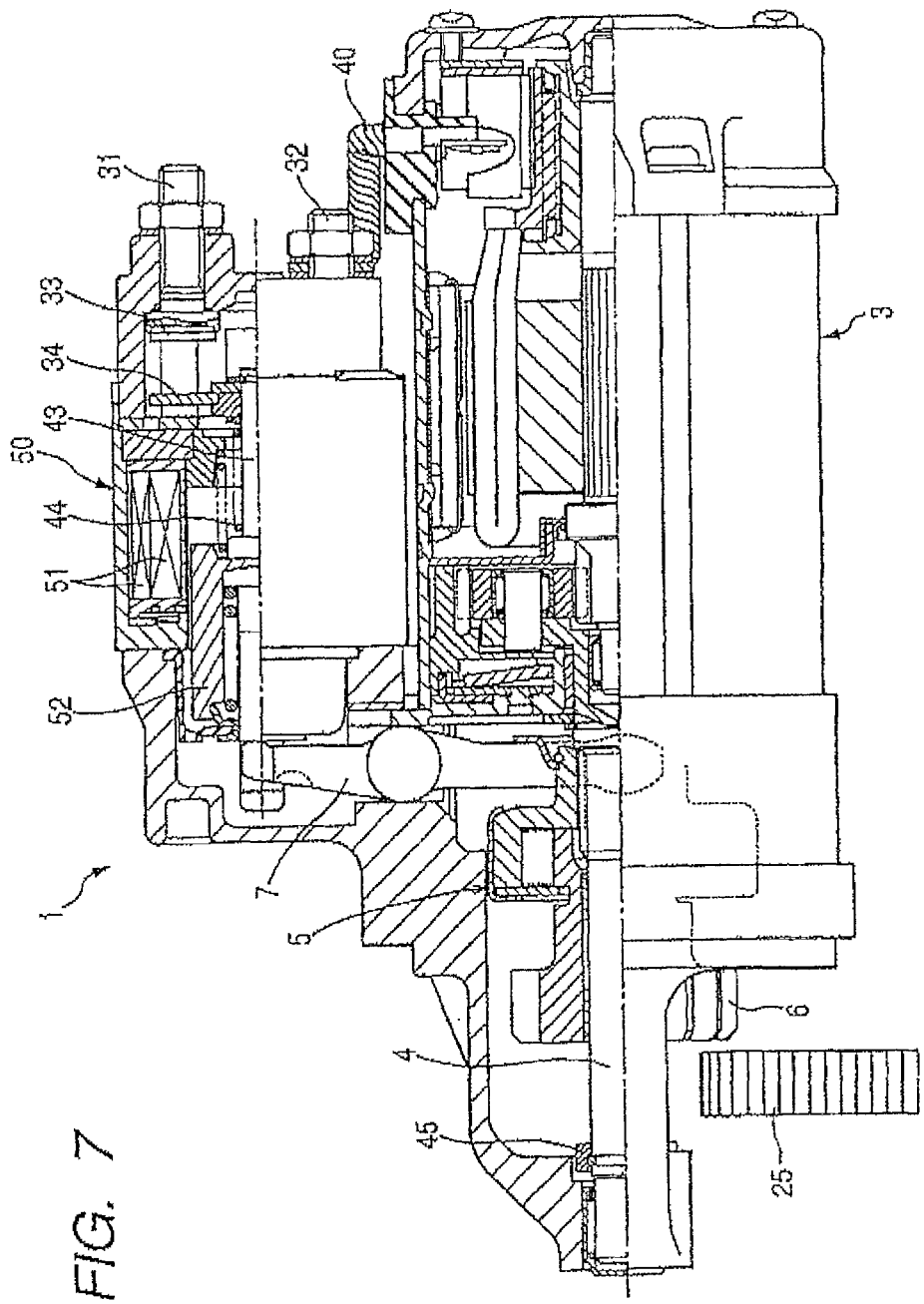
FIG. 7 is a partially sectional view which shows a starter installed in an engine start system according to the fourth embodiment of the invention.
Figure 8:
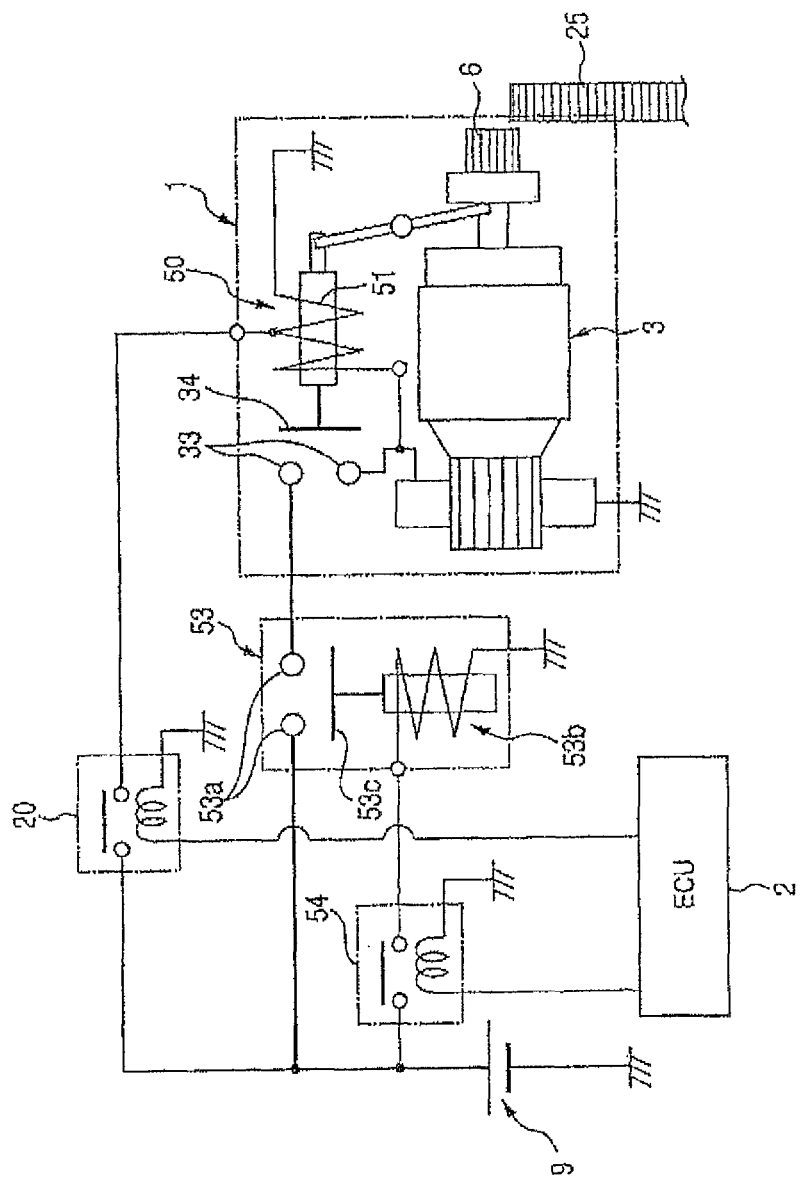
FIG. 8 is a circuit diagram which shows an engine start system according to the fifth embodiment of the invention.

FIG. 8 illustrates an engine start system of the fifth embodiment which is a modification of the fourth embodiment. Specifically, the engine start system includes the pinion-push starter 1 equipped with the solenoid switch 50, as illustrated in FIG. 7, and a motor on-off relay 53.

The solenoid switch 50 of this embodiment is, unlike the fourth embodiment, designed to have a stroke of the plunger 52 which is so selected that the second operation time when the main contacts are to be closed and the first operation time when the pinion gear 6 is to hit the ring gear 25 will coincide with each other.

The motor on-off relay 53, as illustrated in FIG. 8, has relay contacts which are disposed in the motor circuit and located upstream of the main contacts (i.e., the contacts 33 and 34) and works to open or close the relay contacts electrically. Specifically, the motor on-off relay 53 has a pair of fixed contacts 53a disposed in a cable line connecting between a plus terminal of the battery 9 and the B-terminal bolt 31, as illustrated in FIG. 7, of the solenoid switch 50. The motor on-off relay 53 also has a movable contact 53c and a solenoid 53b. When energized, the solenoid 53b pushes the movable contact 53c to establish electric connection between the fixed contacts 53a.

An excitation circuit which works to supply an excitation current to the motor on-off relay 53 from the battery 9 has installed therein a motor on-off sub-relay 54 which are opened or closed by the ECU 2 along with the starter relay 20. The starter relay 20 is, like in the first embodiment, disposed in an excitation circuit which supplies an excitation current to the solenoid switch 50.

The ECU 2 has a delay function which is to be performed when it is requested to restart the engine during the deceleration of the engine to delay the energization of the motor on-off sub-relay 54 to turn on the motor on-off relay 53 to energize the solenoid 53b (i.e., the second operation time) for a given period of time of 30 ms. or more, preferably, 40 ms, or more until after the energization of the starter relay 20 to active the solenoid switch 50 to energize the switch coil 51 (i.e., the first operation time).

The operation of the engine start system will be described below.

When the engine restart conditions are met before the engine stops rotating completely, the ECU 2 energizes the starter relay 20. After an elapse of 30 ms, preferably 40 ms. or more, the ECU 2 energizes the motor on-off sub-relay 54.

When the starter relay 20 is turned on, the current is supplied from the battery 9 to the switch coil 51 of the solenoid switch 50, so that the electromagnet is produced. The electromagnet attracts the plunger 52 (i.e., the right in FIG. 7), thereby thrusting the pinion movable body through the shift lever 7 until the end surface of the pinion gear 6 hits the end surface of the ring gear 25.

The movement of the plunger 52 causes the movable contact 34, as illustrated in FIG. 7, to be brought into abutment with the fixed contacts 33 (only one disposed on the B-terminal bolt 31 is illustrated in FIG. 7), thereby closing the main contacts. At the time when the main contacts are closed, the motor on-off relay 53 is not yet turned on, so that no current is supplied from the battery 9 to the motor 3.

At the time when the end surface of the pinion 6 has hit the end surface of the ring gear 25, and then the ring gear 25 has reached the position where it is engageble with the pinion gear 6, the pinion gear 6 is brought into engagement with the ring gear 6. Afterwards, the motor on-off relay 53 is turned on to supply the current from the battery 9 to the motor 3. This restarts the engine before the engine stops rotating completely, in other words, during the deceleration of the engine. The motor 3 is kept in the off-state until the pinion 6 meshes with the ring gear 25, thus minimizing the mechanical impact or noise arising from the engagement of the pinion gear 6 with the ring gear 25 to ensure the reliability in operation and the service life of the starter 1.

The ECU 2, as described above, sets the time lag between the first and second operation times to 30 ms. or more (preferably 40 ms. or more), but may alternatively select it so that after the starter relay 20 is turned on to thrust the pinion movable body through the solenoid switch 50, the pinion gear 6 moves from the rest position to the maximum movable position where the engagement of the pinion gear 6 with the ring gear 25 is to be achieved, and then engages the pinion gear 6, the motor on-off relay 53 is turned on to energize the motor 3.

The maximum movable position, as referred to above, is the position where one of the opposed ends of the pinion gear 6 which is farther from the one-way clutch 5 abuts or hits the end surface of the pinion stopper 45, as illustrated in FIG. 7, which is fit on the outer periphery of the output shaft 4. When the pinion gear 6 has been placed in abutment with the pinion stopper 45, it means the fact that the pinion gear 6 has engaged the entire width of the ring gear 25 completely, in other words, the complete engagement of the pinion gear 6 with the ring gear 25 is achieved.

The sixth to ninth embodiments of the invention will be described below.

An engine start system of each of the sixth to ninth embodiments is identical with that of the fifth embodiment in structure of the starter 1 with the solenoid switch 50 and the motor on-off relay 53.

The B-terminal bolt 31 of the solenoid switch 50 is, as can be seen in FIG. 9, connected electrically to the M-terminal bolt 32 through a terminal-to-terminal connector 55. The flow of current from the battery 9 to the motor 3 is, therefore, established or blocked only by closing or opening the motor on-off relay 53 regardless of opening or closing of the main contacts by the solenoid switch 50. Specifically, when the motor on-off relay 53 is turned on, the current is supplied from the battery 9 to the motor 3. When the motor relay 52 is turned off, the supply of current to the motor 3 is stopped.

Figure 10:
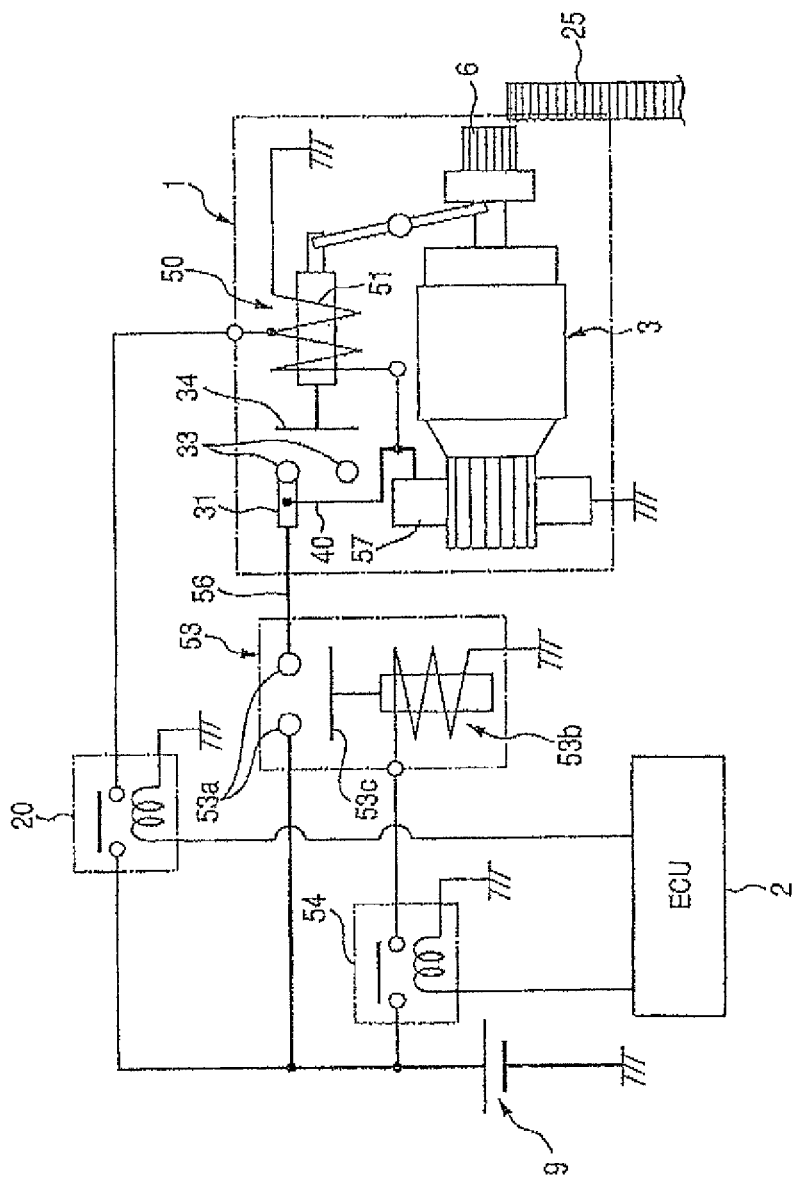
FIG. 10 is a circuit diagram which shows an engine start system according to the seventh embodiment of the invention.

FIG. 10 illustrates the engine start system of the seventh embodiment of the invention. A motor lead 40 extends from an inner circuit of the motor 3 (i.e., a plus (+) brush 57) and connects with the B-terminal bolt 31 of the solenoid switch 50 joined to the motor on-off relay 53 through the cable wire 56. If the solenoid switch 50 is of a conventional structure, the motor lead 40 is, as illustrated in FIG. 7, connected to the M-terminal bolt 32. The motor lead 40 in this embodiment is not connected to the M-terminal bolt 32, but to the B-terminal bolt 31. The M-terminal bolt 32 is, therefore, isolated from the motor circuit.

Like in the sixth embodiment, the flow of current from the battery 9 to the motor 3 is established or blocked only by closing or opening the motor on-off relay 53 regardless of opening or closing of the main contacts by the solenoid switch 50. Specifically, when the motor on-off relay 53 is turned on, the current is supplied to the motor 3 from the B-terminal bolt 31 through the motor lead 40.

Figure 11:
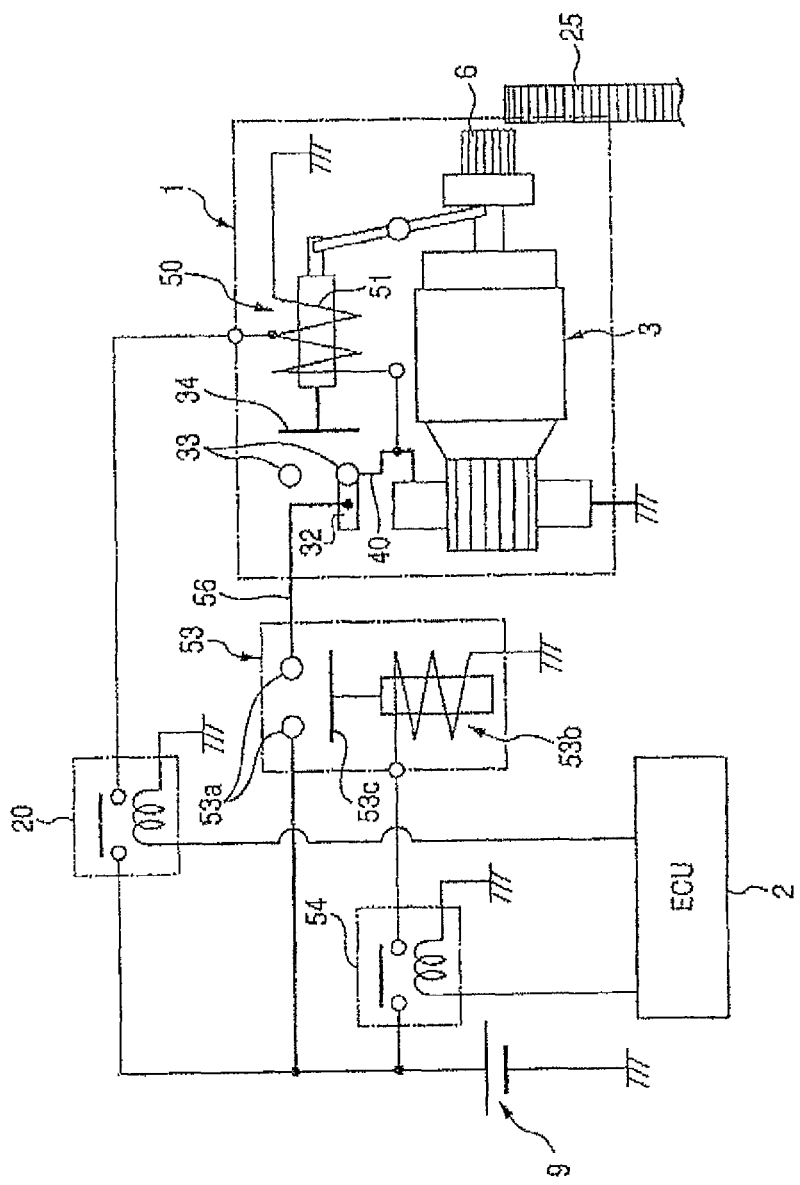
FIG. 11 is a circuit diagram which shows an engine start system according to the eighth embodiment of the invention.

FIG. 11 illustrates the engine start system of the eighth embodiment of the invention. The solenoid switch 50 has the M-terminal bolt 32 and the B-terminal bolt 31. The cable wire 56 is connected to the M-terminal bolt 32 of the solenoid switch 50. In other words, the motor on-off relay 53 is connected to the M-terminal bolt 32 through the cable wire 56. The motor lead 40 is, like in the conventional structure of the solenoid switch 50, connected to the M-terminal bolt 32. The B-terminal bolt 31 is, therefore, isolated from the motor circuit without being connected thereto.

Like in the sixth embodiment, the flow of current from the battery 9 to the motor 3 is established or blocked only by closing or opening the motor on-off relay 53 regardless of opening or closing of the main contacts by the solenoid switch 50. Specifically, when the motor on-off relay 53 is turned on, the current is supplied to the motor 3 from the M-terminal bolt 32 through the motor lead 40.

In the sixth to eighth embodiments, the B-terminal bolt 31 corresponds to a first terminal bolt, as recited in claims 14 to 16, and the M-terminal bolt 32 corresponds to a second terminal bolt, as recited in claims.

Figure 12:
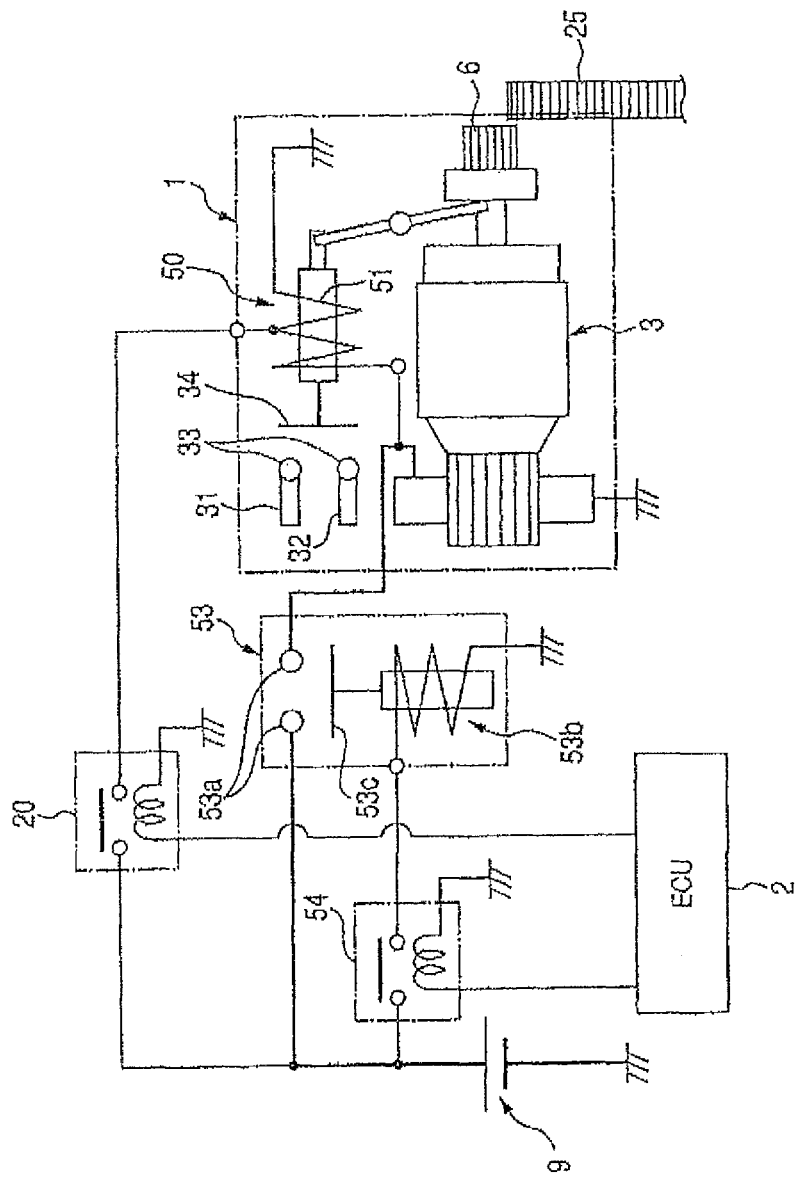
FIG. 12 is a circuit diagram which shows an engine start system according to the ninth embodiment of the invention.

FIG. 12 illustrates the engine start system of the ninth embodiment of the invention. The B-terminal bolt 31 and the M-terminal bolt 32 of the solenoid switch 50 are not connected to the motor circuit. Therefore, the solenoid switch 50 works only to thrust the pinion gear 6 away from the motor 3 through movement of the plunger 52, but does not function to supply or cut the current from the battery 9 to the motor 3.

The motor on-off relay 53 is disposed in, for example, the motor circuit located upstream of the main contacts (i.e., the contacts 33 and 34) and functions to open or close relay contacts electrically to block or establish the flow of current from the battery 9 to the motor 3. The motor on-off relay 53 is not connected to either of the B-terminal bolt 31 or the M-terminal bolt 32 of the solenoid switch 50, but joined directly to the motor 3.

The structure of the sixth to ninth embodiments eliminates the need for a switching function to open or close the main contacts of the solenoid switch 50, thus permitting parts associated with the switching function to be omitted to simplify the structure of the solenoid switch 50, which leads to a decrease in production cost of the engine start system. For instance, the structure in the sixth embodiment eliminates the need for the movable contacts 34, the plunger rod 43 supporting the movable contacts 34, and the spring 44. In the case where the engine start system has the structure in which the terminal bolts 31 and 32 are disposed on a member separate from that on which the fixed contact 33 is disposed, the fixed contact 22 may be omitted.

The structure of the seventh embodiment may omit the M-terminal bolt 32. The structure of the eighth embodiment may omit the B-terminal bolt 31. The structure of the ninth embodiment does not connect the terminal bolts 31 and 32 to the motor circuit, thus permitting the switching function as well as the terminal bolts 31 and 32 to be omitted and may alternatively use the solenoid switch 50 equipped with the terminals 31 and 32 as it is.

The solenoid switch 50 in the sixth to ninth embodiments needs not work as a switch to establish or block the supply of current to operate the motor 3, thus resulting in failure rate of the solenoid switch 50 to improve the reliability in operation of the engine start system.

Figure 13:
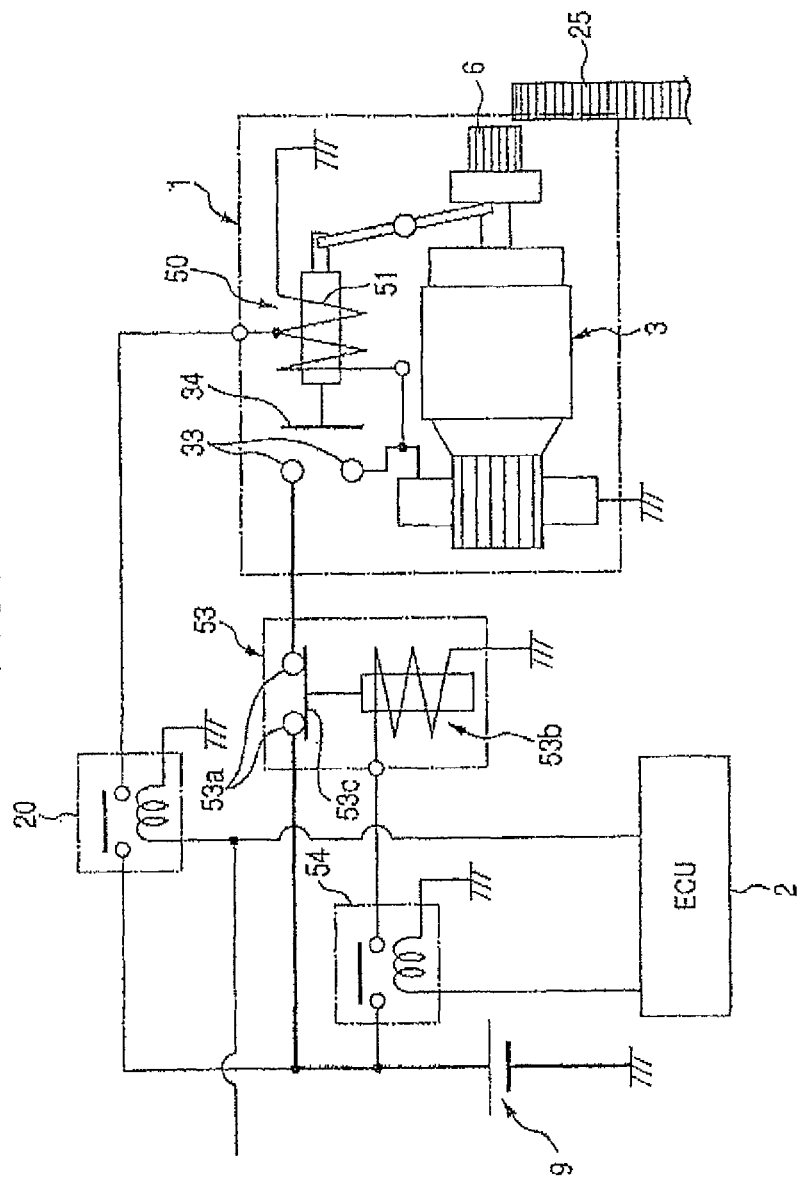
FIG. 13 is a circuit diagram which shows an engine start system according to the tenth embodiment of the invention.

FIG. 13 illustrates an engine start system of the tenth embodiment of the invention which is a modification of the fifth embodiment. The engine start system of this embodiment is identical in arrangement of the starter 1 equipped with the solenoid switch 50 and the motor on-off relay 53 with the fifth embodiment, and explanation thereof in detail will be omitted here.

The motor on-off relay 53 is designed as a normally closed type. When the motor on-off sub-relay 54 is turned on to close the excitation circuit, the motor on-off relay 53 is energized by the battery 9, so that it is turned off to open relay contacts thereof. When the motor on-off sub-relay 54 is turned off to open the excitation circuit, the motor on-off relay 53 is deenergized to close the relay contacts.

Before the solenoid switch 50 closes the main contacts, the ECU 2 turns on the motor on-off sub-relay 54 to turn off the motor on-off relay 53 and then turn off the motor on-off sub-relay 54 to turn on the motor on-off relay 53 at the second operation time. Therefore, when the main contacts are closed by the solenoid switch 50, the motor on-off relay 53 is in the off-state. The motor on-off relay 53 is kept off to maintain the motor 3 turned off until the pinion gear 6 at least partially meshes with the ring gear 25 or the pinion gear 6 travels to the maximum movable position and meshes with the ring gear 25. The torque produced by the motor 3 is, therefore, not transmitted to the pinion gear 6.

The use of the normally closed type of the motor on-off relay 53 permits the engine to be started by, for example, a manual key operation made by a vehicle operator if the ECU 2 has failed in operation. Specifically, the solenoid switch 50 is activated, as can be seen in FIG. 13, in response to a normal input which is produced by manual turning on of an ignition switch to excite the starter relay 20 independently of the ECU 2. The relay contacts of the motor on-off relay 53 are kept closed (i.e., in the on-state) at all the time. The energization of the motor 3 is, thus, achieved by closing the main contacts through the operation of the solenoid switch 50. The structure of the engine start system of this embodiment, as described above, permits the engine to be started by the manual key operation made by the vehicle operator, thus ensuring the high reliability of starting the engine.

The eleventh and twelfth embodiments of the invention will be described below.

Engine start systems of the eleventh and twelfth embodiments are, like in the second embodiment, designed to produce the time lag between the first and second operation times using the delay circuit 46 instead of the ECU 2.

The delay circuit 46 of the second embodiment is installed in the engine start system equipped with the solenoid actuator 8 which thrusts the pinion 6 and the motor relay 10 which opens or closes the main contacts, but the engine start system of this embodiment is, like in the fifth embodiment, equipped with the motor on-off relay 53 and the starter 1 in which the solenoid switch 50 is installed to trust the pinion gear 6 and open or close the main contacts.

Figure 14:
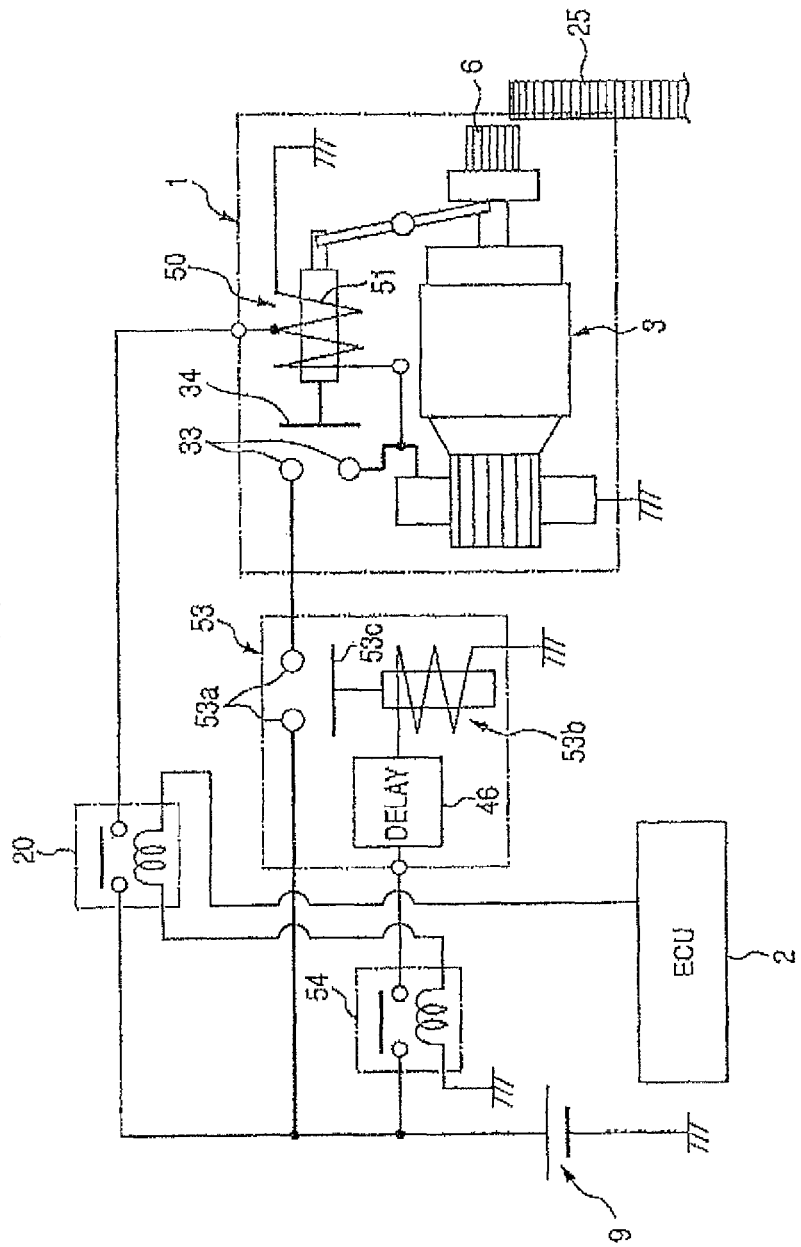
FIG. 14 is a circuit diagram which shows an engine start system according to the eleventh embodiment of the invention.

The delay circuit 46 of the eleventh embodiment is, as illustrated in FIG. 14, connected to the excitation circuit with the motor on-off sub-relay 54 and, as indicated by a dashed line, installed in the motor on-off relay 53.

Figure 15:
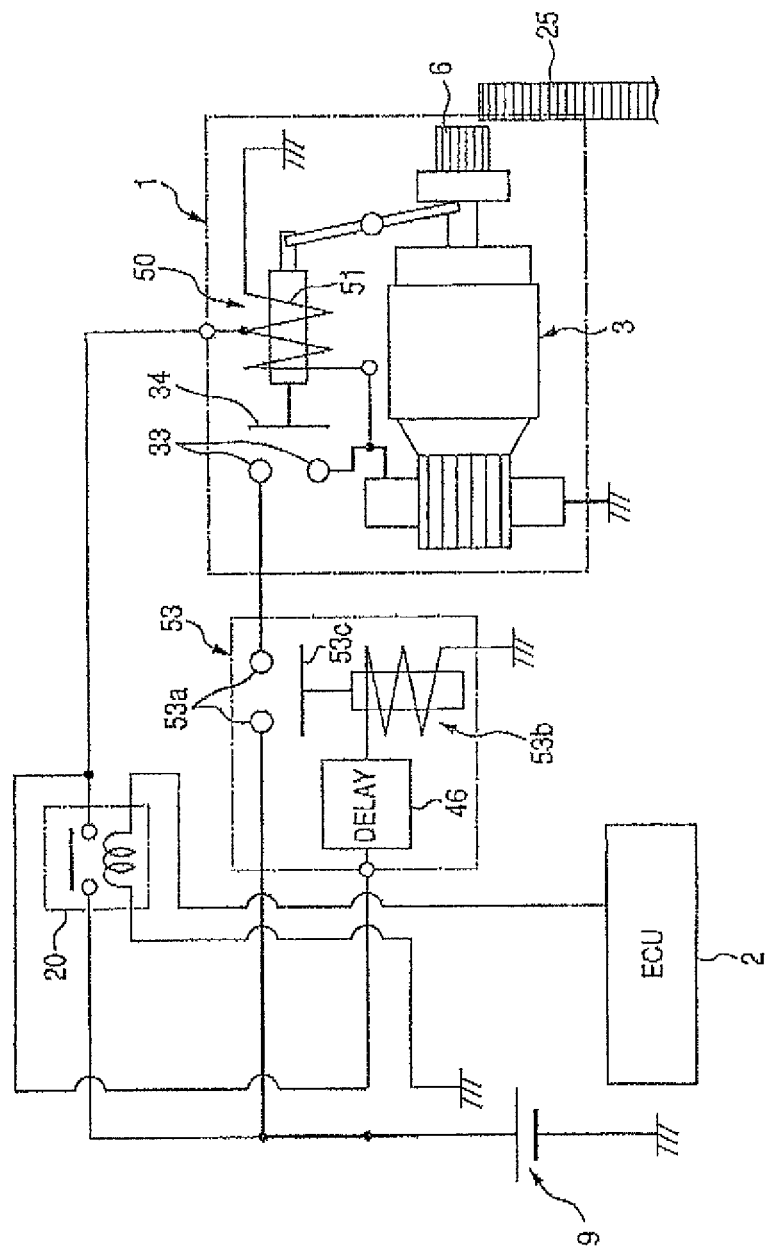
FIG. 15 is a circuit diagram which shows an engine start system according to the twelfth embodiment of the invention.

The delay circuit 46 of the twelfth embodiment is, like in the eleventh embodiment, connected to the excitation circuit which supplies the excitation current to the motor on-off relay 53, but the excitation circuit is, as illustrated in FIG. 15, branched from a downstream side of the starter relay 20 (i.e., closer to the solenoid switch 50) and joined to the motor on-off relay 53 through the delay circuit 46. The delay circuit 46 is, like in the eleventh embodiment, installed in the motor on-off relay 53.

The motor on-off relay 53 of the eleventh and twelfth embodiments, as described above, has built therein the delay circuit 46 connecting with the excitation circuit of the motor on-off relay 53, thus eliminating the need for separate control systems for controlling the operations of the solenoid switch 50 and the motor on-off relay 53, respectively. In other words, the engine start system is, as can be seen in FIGS. 14 and 15, so designed that the ECU 2 controls the solenoid switch 50 and the motor on-off relay 53 through a single circuit line, thereby eliminating the need for use of a plurality of output ports of the ECU 2 and resulting in a reduction in production cost of the engine start system.

Figure 16:
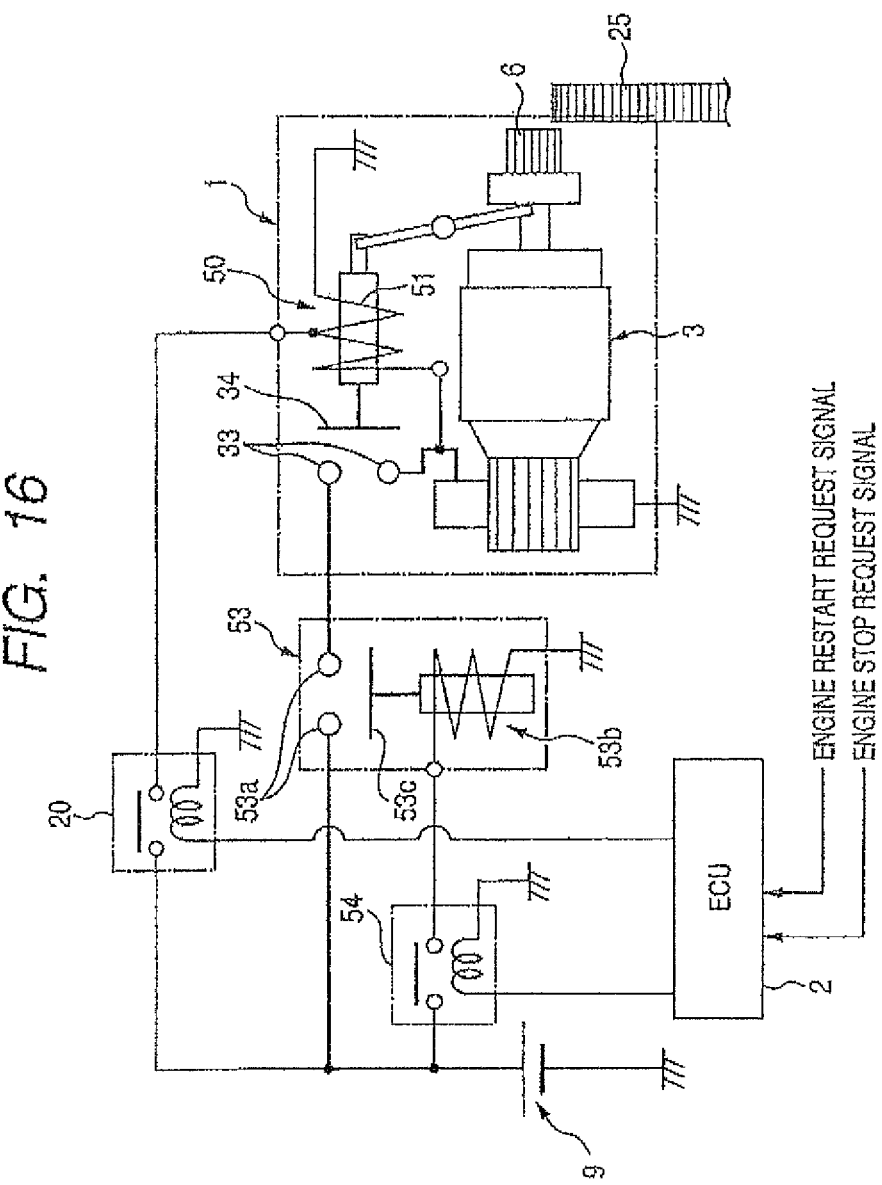
FIG. 16 is a circuit diagram which shows an engine start system according to the thirteenth embodiment of the invention.

FIG. 16 illustrates an engine start system according to the thirteenth embodiment of the invention which is designed to establish engagement of the pinion gear 6 with the ring gear 25 and keep the motor on-off relay 53 off until an engine restart request signal is inputted to the ECU 2 during deceleration of the engine prior to the stop of the engine. The engine restart request signal is a signal indicating that the above described engine restart conditions have been met and may be provided by an output from the brake sensor and/or an output from a selector level sensor for the automatic transmission.

The engine start system is, like in the fifth embodiment, equipped with the motor on-off relay 53 and the starter 1 in which the solenoid switch 50 is installed to thrust the pinion gear 6 and the open or close the main contacts. Additionally, the ECU 2 has a delay function which is to be performed to delay the energization of the motor on-off relay 53 (i.e., the second operation time) until after the energization of the solenoid switch 50 (i.e., the first operation time).

During deceleration of the engine prior to the stop thereof, the ECU 2 turns on the starter relay 20 to activate the solenoid switch 50 to move the pinion gear 6 and keeps the motor on-off relay 53 off, in other words, delays the on-operation of the motor on-off relay 53 until the pinion gear 6 meshes with the ring gear 25 at least partially or is placed in mesh with the ring gear 25 at the maximum movable position, and the main contacts are closed, after which the engine restart request signal is inputted to the ECU 2.

The ECU 2 brings the pinion gear 6 into engagement with the ring gear 25 before the engine restart conditions are met, that is, the engine restart request signal is inputted thereinto and keeps such engagement until and after the engine stops. Afterwards, when the engine restart request signal is inputted, the ECU 2 turns on the motor on-off relay 53 to activate the motor 3 to crank the engine. This results in a decreased time required to restart the engine. The pinion gear 6 is brought into engagement with the ring gear 25 during the deceleration of the engine, thus eliminating the mechanical impact or noise which typically arises from the engagement of the pinion gear 6 with the ring gear 25 when the engine is cranked.

Figure 17:
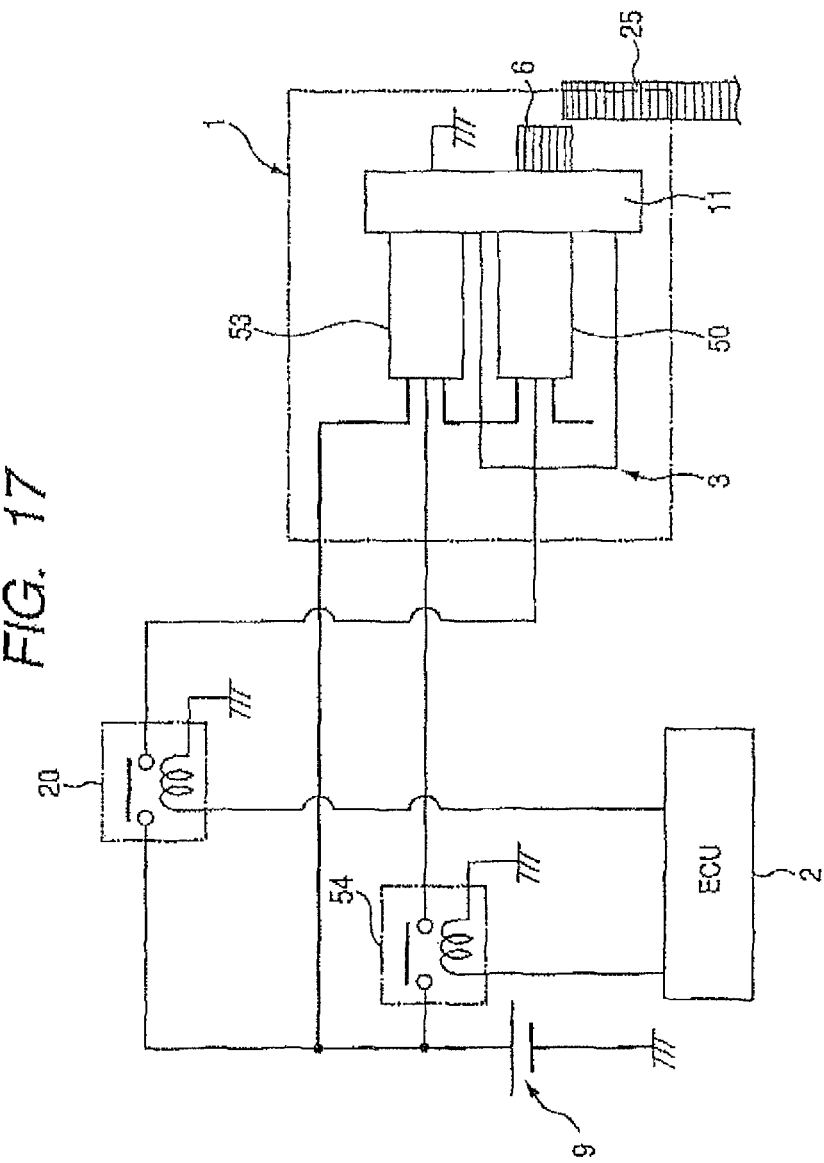
FIG. 17 is a circuit diagram which shows an engine start system according to the fourteenth embodiment of the invention.

FIG. 17 illustrates an engine start system according to the fourteenth embodiment of the invention in which the motor on-off relay 53, as referred to in the five to thirteenth embodiments, is mounted on the starter housing 11.

The starter 1 is a part to be installed on the engine. It is, thus, essential to assure the quality of the starter 1 against mechanical vibrations. In order to meet such quality assurance, the motor on-off relay 53 is secured to the starter housing 11 which is close to an engine mount and smallest in magnitude of the vibration.

Modifications of the first to thirteenth embodiments will be described below.

The engine start system of the first to thirteenth embodiments works to bring the pinion gear 6 into engagement with the ring gear 25 during the deceleration of the engine prior to the stop thereof. The engagement of the pinion gear 6 with the ring gear 25 when the speed of the engine is relatively high usually results in an increase in magnitude of the impact arising from the engagement of the pinion gear 6 with the ring gear 25. In order to alleviate this problem, the engine start system may be designed to bring the pinion gear 6 into engagement with the ring gear 25 when the speed of the engine is lower than a preselected idle speed (e.g., 300 rpm) during the deceleration of the engine prior to the stop thereof.

In the first embodiment, the solenoid actuator 8 and the motor relay 10 are aligned in series in the axial direction thereof, but they may alternatively be disposed independently of each other. For instance, they may be disposed out of alignment with each other in the axial direction of the motor 3.

The engine start systems of the sixth to eighth and tenth to twelfth embodiments have the motor on-off relay 53 which is disposed in the motor circuit and located upstream of the main contacts of the solenoid switch 50, but may alternatively be designed to have the motor on-off relay 53 disposed downstream of the main contacts, that is, between the M-terminal bolt 32 of the solenoid switch 50 and the motor 3 (between the B-terminal bolt 31 and the motor 3 in the seventh embodiment).

The engine start system of each of the first to thirteenth embodiments is mounted in the automotive vehicle equipped with the idle stop system, but however, the present invention may be used with automotive vehicles which are not equipped with the idle stop system. For example, the engine start systems of the invention may be used to restart the engine before it stops completely after the ignition switch is turned off in vehicles in which the engine is started by the starter 1 in response to turning on of the ignition switch and stopped in response to turning off of the ignition switch.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An engine start system comprising:
  a motor which is energized by supply of electric power from a battery through a motor circuit to produce torque;
  an output shaft which rotates when subjected to the torque, as produced by said motor;
  a pinion gear through which the torque, as produced by said motor, is transmitted to a ring gear coupled to an engine;
  a pinion movable body which is movable along said output shaft together with said pinion gear;
  a pinion actuator working to move said pinion movable body to the ring gear;
  a switching mechanism working to open or close main contacts installed in the motor circuit to cut or supply the electric power from the battery to said motor;
  a controller which controls operations of said pinion actuator and said switching mechanism when the engine is restarted during deceleration of the engine prior to stop of the engine; and
  delay means for delaying a second operation time that is a time when said switching mechanism is to be activated to close the main contacts until after a first operation time that is a time when said pinion actuator is to be activated to move said pinion movable body when the engine is restarted, said delay means producing a time lag between the first and second operation times so as to close the main contacts through said switching mechanism to supply the electric power to said motor after said pinion movable body is moved by said pinion actuator to shift the pinion gear from a rest position to a gear engageable position where said pinion gear is engageable with the ring gear, and then said pinion gear engages the ring gear,
  wherein the controller is configured to operate the switching mechanism at the second operation time based on the first operation time and the time lag produced by the delay means.

2. An engine start system as set forth in claim 1, wherein said delay means sets the time lag between the first and second operation times to 30 ms or more.

3. An engine start system as set forth in claim 1, wherein said pinion actuator is implemented by a solenoid actuator which produces a first electromagnet, and said switching mechanism is implemented by a motor on-off switch which produces a second electromagnet, and wherein said controller is designed to control operations of the solenoid actuator and the motor on-off switch independently of each other and has installed therein a delay function which makes up said delay means.

4. An engine start system as set forth in claim 1, wherein said pinion actuator is implemented by a solenoid actuator which produces a first electromagnet, and said switching mechanism is implemented by a motor on-off switch which produces a second electromagnet, wherein said controller is designed to control operations of the solenoid actuator and the motor on-off switch independently of each other, and wherein said delay means is implemented by a delay circuit connected to an excitation circuit which works to excite the motor on-off switch.

5. An engine start system as set forth in claim 3, wherein said controller changes the time lag between when the engine is requested to be restarted during the deceleration of the engine and when the engine is requested to be restarted after a complete stop of the engine.

6. An engine start system as set forth in claim 3, wherein said solenoid actuator and said motor on-off switch are aligned in series with each other in an axial direction thereof.

7. An engine start system as set forth in claim 6, wherein said solenoid actuator and said motor on-off switch have casings, respectively, which are arrayed integrally in the axial direction and constitute a magnetic circuit.

8. An engine start system as set forth in claim 1, further comprising a magnetic coil producing an electromagnet when energized, a plunger which is movable along an inner periphery of said magnetic coil in an axial direction thereof, and a single electromagnetic switch designed to perform both an operation of said pinion actuator and an operation of the switching mechanism following movement of said plunger, and wherein the time lag is provided by a plunger stroke that is a distance which said plunger moves from a time when said plunger starts to be moved by attraction, as produced by the electromagnetic, until the main contacts are closed.

9. An engine start system as set forth in claim 1, wherein the engine start system is installed in a vehicle equipped with an idle stop system working to stop and restart the engine automatically.

10. An engine start system comprising:
  a motor which is energized by supply of electric power from a battery through a motor circuit to produce torque;
  an output shaft which rotates when subjected to the torque, as produced by said motor;
  a pinion gear through which the torque, as produced by said motor, is transmitted to a ring gear coupled to an engine;
  a pinion movable body which is movable along said output shaft together with said pinion gear;
  a pinion actuator working to move said pinion movable body to the ring gear;
  a switching mechanism working to open or close main contacts installed in the motor circuit to cut or supply the electric power from the battery to said motor;

a controller which controls operations of said pinion actuator and said switching mechanism when the engine is restarted during deceleration of the engine prior to stop of the engine; and delay means for delaying a second operation time that is a time when said switching mechanism is to be activated to close the main contacts until after a first operation time that is a time when said pinion actuator is to be activated to move said pinion movable body when the engine is restarted, said delay means producing a time lag between the first and second operation times so as to close the main contacts through said switching mechanism to supply the electric power to said motor after said pinion movable body is moved by said pinion actuator to advance the pinion gear from a rest position to a maximum movable position where engagement of said pinion gear with the ring gear is to be achieved, and then said pinion gear has engaged the ring gear, wherein the controller is configured to operate the switching mechanism at the second operation time based on the first operation time and the time lag produced by the delay means.

11. An engine start system as set forth in claim 10, wherein said delay means sets the time lag between the first and second operation times to 30 ms or more.

12. An engine start system as set forth in claim 10, wherein said pinion actuator is implemented by a solenoid actuator which produces a first electromagnet, and said switching mechanism is implemented by a motor on-off switch which produces a second electromagnet, and wherein said controller is designed to control operations of the solenoid actuator and the motor on-off switch independently of each other and has installed therein a delay function which makes up said delay means.

13. An engine start system as set forth in claim 10, wherein said pinion actuator is implemented by a solenoid actuator which produces a first electromagnet, and said switching mechanism is implemented by a motor on-off switch which produces a second electromagnet, wherein said controller is designed to control operations of the solenoid actuator and the motor on-off switch independently of each other, and wherein said delay means is implemented by a delay circuit connected to an excitation circuit which works to excite the motor on-off switch.

14. An engine start system as set forth in claim 12, wherein said controller changes the time lag between when the engine is requested to be restarted during the deceleration of the engine and when the engine is requested to be restarted after a complete stop of the engine.

15. An engine start system as set forth in claim 12, wherein said solenoid actuator and said motor on-off switch are aligned in series with each other in an axial direction thereof.

16. An engine start system as set forth in claim 15, wherein said solenoid actuator and said motor on-off switch have casings, respectively, which are arrayed integrally in the axial direction and constitute a magnetic circuit.

17. An engine start system as set forth in claim 10, further comprising a magnetic coil producing an electromagnet when energized, a plunger which is movable along an inner periphery of said magnetic coil in an axial direction thereof, and a single electromagnetic switch designed to perform both an operation of said pinion actuator and an operation of the switching mechanism following movement of said plunger, and wherein the time lag is provided by a plunger stroke that is a distance which said plunger moves from a time when said plunger starts to be moved by attraction, as produced by the electromagnetic, until the main contacts are closed.

18. An engine start system as set forth in claim 10, wherein the engine start system is installed in a vehicle equipped with an idle stop system working to stop and restart the engine automatically.

19. An engine start system comprising:

a motor which is energized by supply of electric power from a battery through a motor circuit to produce torque;

an output shaft which rotates when subjected to the torque, as produced by said motor;

a pinion gear through which the torque, as produced by said motor, is transmitted to a ring gear coupled to an engine;

a pinion movable body which is movable along said output shaft together with said pinion gear;

a pinion solenoid actuator which produce magnetic attraction to thrust said pinion movable body toward the ring gear;

a motor on-off switch which opens or closes main contacts installed in the motor circuit to cut or supply the electric power to said motor;

a first relay disposed in an excitation circuit which supplies electric power from the battery to said pinion solenoid actuator;

a second relay disposed in an excitation circuit which supplies electric power from the battery to said motor on-off switch;

a controller configured to control an operation of said pinion solenoid actuator through said first relay and an operation of said motor on-off switch through said second relay when the engine is restarted during deceleration of the engine prior to stop of the engine;

a delay circuit configured to delay a second operation time that is a time when said second relay is to be energized until after a first operation time that is a time when said first relay is to be energized when the engine is restarted; and a single electric wire connecting with an output port of said controller, said electric wire having a first relay branch line leading to said first relay and a second relay branch line leading to said second relay through said delay circuit, wherein said delay circuit is configured to produce a time lag between the first and second operation times so as to close said motor on-off switch to supply the electric power to said motor after said pinion gear is moved by said pinion solenoid actuator from a rest position to a gear engageable position where said pinion gear is engageable with the ring gear and then engages the ring gear or from the rest portion to a maximum movable position where engagement of said pinion gear with the ring gear is to be established and then engages the ring gear, and wherein the controller is configured to operate the motor on-off switch at the second operation time based on the first operation time and the time lag produced by the delay circuit.

20. An engine start system as set forth in claim 19, wherein the engine start system is installed in a vehicle equipped with an idle stop system working to stop and restart the engine automatically.

* * * * *